United States Patent
Pope et al.

(10) Patent No.: US 7,769,923 B2
(45) Date of Patent: Aug. 3, 2010

(54) INTERRUPT MANAGEMENT FOR MULTIPLE EVENT QUEUES

(75) Inventors: Steve Pope, Cambridge (GB); David Riddoch, Cambridge (GB); Ching Yu, Santa Clara, CA (US); Derek Roberts, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 510 days.

(21) Appl. No.: 11/050,476

(22) Filed: Feb. 3, 2005

(65) Prior Publication Data

US 2005/0183093 A1    Aug. 18, 2005

(30) Foreign Application Priority Data

Mar. 2, 2004    (GB)    ................. 0404696.7

(51) Int. Cl.
*G06F 3/00*    (2006.01)
*G06F 13/28*    (2006.01)
(52) U.S. Cl. ................. 710/52; 710/22; 710/54
(58) Field of Classification Search ............ 710/54, 710/22
See application file for complete search history.

(56) References Cited

U.S. PATENT DOCUMENTS

| | | | |
|---|---|---|---|
| 5,325,536 A | 6/1994 | Chang et al. | |
| 5,740,467 A | 4/1998 | Chmielecki, Jr. et al. | |
| 5,813,022 A * | 9/1998 | Ramsey et al. | 711/3 |
| 5,966,547 A | 10/1999 | Hagan et al. | |
| 6,070,219 A * | 5/2000 | McAlpine et al. | 710/263 |
| 6,334,162 B1 | 12/2001 | Garrett et al. | |
| 6,341,301 B1 * | 1/2002 | Hagan | 718/100 |
| 6,393,457 B1 * | 5/2002 | Allison et al. | 709/201 |
| 6,397,316 B2 | 5/2002 | Fesas, Jr. | |
| 7,020,712 B1 | 3/2006 | Chin | |
| 2002/0152327 A1 | 10/2002 | Kagan et al. | |
| 2003/0065856 A1* | 4/2003 | Kagan et al. | 710/263 |
| 2005/0138242 A1 | 6/2005 | Pope et al. | |
| 2007/0214308 A1 | 9/2007 | Pope et al. | |

OTHER PUBLICATIONS

Mansley, Kieran, "Engineering a User-Level TCP for the Clan Network," Laboratory for Communications Engineering, University of Cambridge, Cambridge, England, Proceedings of the ACM SIGCOMM 2003 Workshops.

COMPAQ Computer Corp., Intel Corporation, Microsoft Corporation, "Virtual Interface Architecture Specification," Version 1.0, Dec. 16, 1997.

(Continued)

*Primary Examiner*—Henry W. H. Tsai
*Assistant Examiner*—Juanito C Borromeo
(74) *Attorney, Agent, or Firm*—Warren S. Wolfeld; Haynes Beffel & Wolfeld LLP

(57) ABSTRACT

Method of managing interaction between a host subsystem and a peripheral device. Roughly described, the peripheral device writes an event into an individual event queue, and in conjunction therewith, also writes a wakeup event into an intermediary event queue. The wakeup event identifies the individual event queue. The host subsystem, in response to retrieval of the wakeup event from the intermediary event queue, activates an individual event handler to consume events from the individual event queue.

32 Claims, 16 Drawing Sheets

OTHER PUBLICATIONS

PCI Special Interest Group, "PCI-X Addendum to the PCI Local Bus Specification," Rev. 1.0a, Jul. 24, 2000.
Riddoch, David et al.; "Distributed Computing With the CLAM Network"; Laboratory for Communications Engineering, Cambridge, England; SIGCOMM 2002, 13 pages.
Mansley, Kieran; "Engineering a User-Level TCP for the CLAN Network"; Laboratory for Communication Engineering, University of Cambridge, Cambridge, England; AGM SIGCOMM Aug. 2003 Workshops, 228-236.
Pratt, Ian et al.; "Arsenic: A User-Accessible Gigabit Ethernet Interface"; Computer Laboratory, University of Cambridge, England; UK Engineering and Physical Sciences Research Councel (EPSRC), Apr. 2001, 11 pages.
Supplementary European search report dated Oct. 10, 2007 for EP 05712621.1.
Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
F.F. Kuo; ACM Computer Communication Review, vol. 4 No. 1, Jan. 1974.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, Sep. 1979.
John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Robert M. Brandriff, et al.; ACM Computer Communication Review, vol. 15, No. 4, Sep. 1985.
C. Kline; ACM Computer Communication Review, vol. 17, No. 5, Aug. 1987.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Derek Robert McAuley; PhD Thesis, University of Cambridge, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
Bruce S. Davie; ACM Computer Communication Review, vol. 21, No. 4, Sep. 1991.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.
Greg Chesson; Proceedings of the Third International Conference on High Speed Networking, Nov. 1991.
Michael J. Dixon; University of Cambridge Computer Laboratory Technical Report No. 245, Jan. 1992.
Danny Cohen, Gregory Finn, Robert Felderman, Annette DeSchon; Made available by authors, Jan. 10, 1992.
Gene Tsudik; ACM Computer Communication Review, vol. 22, No. 5, pp. 29-38, Oct. 1992.
Peter Steenkiste; ACM Computer Communication Review, vol. 22, No. 4, Oct. 1992.
Paul E. McKenney and Ken F. Dove; ACM Computer Communication Review, vol. 22, No. 4, Oct. 1992.
Erich Ruetsche and Matthias Kaiserswerth; Proceedings of the IFIP TC6/WG6.4 Fourth International Conference on High Performance Networking IV, Dec. 14, 1992.
C. Traw and J. Smith; IEEE Journal on Selected Areas in Communications, pp. 240-253, Feb. 1993.
E. Ruetsche; ACM Computer Communication Review, vol. 23, No. 3, Jul. 1993.
Jonathan M. Smith and C. Brendan S. Traw; IEEE Network, vol. 7, Issue 4, pp. 44-52, Jul. 1993.
Jeffrey R. Michel; MSci Thesis, University of Virginia, Aug. 1993.
Mark David Hayter; PhD Thesis, University of Cambridge, Sep. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
C. A. Thekkath, et al.; ACM Computer Communication Review, vol. 23, No. 4, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.

A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997,2 pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5 pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9 pp.
Bruce Lowekamp, et al.; ACM Computer Communication Review, vol. 31, No. 4, Oct. 2001.
Piyush Shivam, et al.; Proceedings of the 2001 ACM/IEEE conference on Supercomputing, p. 57, Denver, Nov. 10, 2001.
Robert Ross, et al.; Proceedings of the 2001 ACM/IEEE conference on Supercomputing, p. 11, Denver, Nov. 10, 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, p. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, 2005, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference Jan. 1996.

Ken Calvert; ACM Computer Communication Review, vol. 36, No. 2, pp. 27-30, Apr. 2006.

Jon Crowcroft; ACM Computer Communication Review, vol. 36, No. 2, pp. 51-52, Apr. 2006.

Greg Minshall, et al.; ACM Computer Communication Review, vol. 36, No. 3, pp. 79-92, Jul. 2006.

David Wetherall; ACM Computer Communication Review, vol. 36, No. 3, pp. 77-78, Jul. 2006.

Patrick Geoffray; HPCWire article: http://www.hpcwire.com/features/17886984.html, Aug. 18, 2006.

Geoffray P., "Protocol off-loading vs on-loading in high-performance networks," 14th Symposium on High Performance Interconnects, Aug. 23, 2006, 5pp.

Jose Carlos Sancho, et al.; Proceedings of the 2006 ACM/IEEE conference on Supercomputing, Tampa, Florida, Nov. 11, 2006.

Sayantan Sur, et al.; Proceedings of the 2006 ACM/IEEE conference on Supercomputing, Tampa, Florida, Nov. 11, 2006.

Steven Pope, David Riddoch; ACM Computer Communication Review, vol. 37, No. 2, pp. 89-92, Mar. 19, 2007.

Kieran Mansley, et al.; Euro-Par Conference 2007, pp. 224-233, Rennes, France, Aug. 28, 2007.

M. Kaiserswerth; IEEE/ACM Transactions in Networking vol. 1, Issue 6, pp. 650-663, Dec. 1993.

Danny Cohen, et al.; ACM Computer Communication Review, vol. 23, No. 4, p. 32-44, Jul. 1993.

J. Evans and T. Buller; IEEE TCGN Gigabit Networking Workshop, Apr. 22, 2001.

M.V. Wilkes and R.M. Needham; ACM SIGOPS Operating Systems Review, vol. 14, Issue 1, pp. 21-29, Jan. 1980.

Dickman, L., "Protocol OffLoading vs OnLoading in High Performance Networks," 14th Symposium on High Performance Interconnects, Aug. 23, 2006, 8pp.

Mogul J., "TCP offload is a dumb idea whose time has come," USENIX Assoc., Proceedings of HotOS IX: The 9th Workshop on Hot Topics in Operating Systems, May 2003, pp. 24-30.

Petrini F., "Protocol Off-loading vs On-loading in High-Performance Networks," 14th Symposium on High Performance Interconnects, Aug. 23, 2006, 4pp.

Regnier G., "Protocol Onload vs. Offload," 14th Symposium on High Performance Interconnects, Aug. 23, 2006, 1pp.

Montry G., OpenFabrics Alliance presentation slides, 14th Symposium on High Performance Interconnects, Aug. 23, 2006, 8pp.

Compaq Comuputer Corp., Intel Corp., Microsoft Corp.; "Virtual Interface Architecture Specification," v.1.0, Dec. 1997, 83 pp.

Pratt I. et al., "Arsenic: A User-Accessible Gigabit Ethernet Interface," Univ. Cambridge, England, 11 pp.

* cited by examiner

INTERRUPT MANAGEMENT FOR MULTIPLE EVENT QUEUES

CLAIM OF PRIORITY

This application claims foreign priority benefits under 35 U.S.C. 119(a)-(d) or (f), of the following foreign patent application, the entirety of which is incorporated by reference herein:

| Prior Foreign Application Number | Country | Foreign Filing Date | Priority Claimed? | Docket |
|---|---|---|---|---|
| 0404696.7 | GB | 2 Mar. 2004 | Yes | P/304466.GB |

BACKGROUND

1. Field of the Invention

The invention relates to network interfaces, and more particularly to queue-based network transmit and receive mechanisms that maximize performance.

2. Description of Related Art

When data is to be transferred between two devices over a data channel, such as a network, each of the devices must have a suitable network interface to allow it to communicate across the channel. Often the network is based on Ethernet technology. Devices that are to communicate over a network are equipped with network interfaces that are capable of supporting the physical and logical requirements of the network protocol. The physical hardware component of network interfaces are referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

Most computer systems include an operating system (OS) through which user level applications communicate with the network. A portion of the operating system, known as the kernel, includes protocol stacks for translating commands and data between the applications and a device driver specific to the NIC, and the device drivers for directly controlling the NIC. By providing these functions in the operating system kernel, the complexities of and differences among NICs can be hidden from the user level application. In addition, the network hardware and other system resources (such as memory) can be safely shared by many applications and the system can be secured against faulty or malicious applications.

In the operation of a typical kernel stack system a hardware network interface card interfaces between a network and the kernel. In the kernel a device driver layer communicates directly with the NIC, and a protocol layer communicates with the system's application level.

The NIC stores pointers to buffers in host memory for incoming data supplied to the kernel and outgoing data to be applied to the network. These are termed the RX data ring and the TX data ring. The NIC updates a buffer pointer indicating the next data on the RX buffer ring to be read by the kernel. The TX data ring is supplied by direct memory access (DMA) and the NIC updates a buffer pointer indicating the outgoing data which has been transmitted. The NIC can signal to the kernel using interrupts.

Incoming data is picked off the RX data ring by the kernel and is processed in turn. Out of band data is usually processed by the kernel itself Data that is to go to an application-specific port is added by pointer to a buffer queue, specific to that port, which resides in the kernel's private address space.

The following steps occur during operation of the system for data reception:

1. During system initialization the operating system device driver creates kernel buffers and initializes the RX ring of the NIC to point to these buffers. The OS also is informed of its IP host address from configuration scripts.
2. An application wishes to receive network packets and typically creates a socket, bound to a Port, which is a queue-like data structure residing within the operating system. The port has a number which is unique within the host for a given network protocol in such a way that network packets addressed to <host:port> can be delivered to the correct port's queue.
3. A packet arrives at the network interface card (NIC). The NIC copies the packet over the host I/O bus (e.g. a PCI bus) to the memory address pointed to by the next valid RX DMA ring Pointer value.
4. Either if there are no remaining DMA pointers available, or on a pre-specified timeout, the NIC asserts the I/O bus interrupt in order to notify the host that data has been delivered.
5. In response to the interrupt, the device driver examines the buffer delivered and if it contains valid address information, such as a valid host address, passes a pointer to the buffer to the appropriate protocol stack (e.g. TCP/IP). In some systems the device driver is able to switch to polling for a limited period of time in order to attempt to reduce the number of interrupts.
6. The protocol stack determines whether a valid destination port exists and if so, performs network protocol processing (e.g. generate an acknowledgment for the received data) and enqueues the packet on the port's queue.
7. The OS may indicate to the application (e.g. by rescheduling and setting bits in a "select" bit mask) that a packet has arrived on the network end point to which the port is bound (by marking the application as runnable and invoking a scheduler).
8. The application requests data from the OS, e.g. by performing a recv( ) system call (supplying the address and size of a buffer) and while in the OS kernel, data is copied from the kernel buffer into the application's buffer. On return from the system call, the application may access the data from the application buffer.
9. After the copy (which usually takes place in the context of a soft interrupt), the kernel will return the kernel buffer to an OS pool of free memory. Also, during the interrupt the device driver allocates a new buffer and adds a pointer to the DMA ring. In this manner there is a circulation of buffers from the free pool to an application's port queue and back again.
10. Typically the kernel buffers are located in physical RAM and are never paged out by the virtual memory (VM) system. However, the free pool may be shared as a common resource for all applications.

For data transmission, the following steps occur.

1. The operating system device driver creates kernel buffers for use for transmission and initializes the TX ring of the NIC.
2. An application that is to transmit data stores that data in an application buffer and requests transmission by the OS, e.g. by performing a send( ) system call (supplying the address and size of the application buffer).

3. In response to the send( ) call, the OS kernel copies the data from the application buffer into the kernel buffer and applies the appropriate protocol stack (e.g. TCP/IP).

4. A pointer to the kernel buffer containing the data is placed in the next free slot on the TX ring. If no slot is available, the buffer is queued in the kernel until the NIC indicates e.g. by interrupt that a slot has become available.

5. When the slot comes to be processed by the NIC it accesses the kernel buffer indicated by the contents of the slot by DMA cycles over the host I/O bus and then transmits the data.

It has been recognized in the past that both the transmit and receive operations can involve excessive data movement. Some solutions have been proposed for reducing the performance degradation caused by such data movement. See, for example, U.S. Pat. No. 6,246,683, incorporated by reference herein. In PCT International Publication No. WO 2004/025477 A2, incorporated by reference herein, it was further recognized that both the transmit and receive operations can involve excessive context switching, which also causes significant overhead. Techniques are described therein for reducing the number of context switches required.

Among the mechanisms described therein is the use of event queues for communicating control information between the host system and the NIC. When a network interface device is attached to a host system via an I/O bus, such as via a PCI bus, there is a need for frequent communication of control information between the processor and NIC. Typically control communication is initiated by an interrupt issued by the NIC, which causes a context switch. In addition, the communication often requires the host system to read or write the control information from or to the NIC via the PCI bus, and this can cause bus bottlenecks. The problem is especially severe in networking environments where data packets are often short, causing the amount of required control work to be large as a percentage of the overall network processing work.

In the embodiment described in the PCT publication, a "port" is considered to be an operating system specific entity which is bound to an application, has an address code, and can receive messages. One or more incoming messages that are addressed to a port form a message queue, which is handled by the operating system. The operating system has previously stored a binding between that port and an application running on the operating system. Messages in the message queue for a port are processed by the operating system and provided by the operating system to the application to which that port is bound. The operating system can store multiple bindings of ports to applications so that incoming messages, by specifying the appropriate port, can be applied to the appropriate application. The port exists within the operating system so that messages can be received and securely handled no matter what the state of the corresponding application.

At the beginning of its operations, the operating system creates a queue to handle out of band messages. This queue may be written to by the NIC and may have an interrupt associated with it. When an application binds to a port, the operating system creates the port and associates it with the application. It also creates a queue (an event queue) to handle out of band messages for that port only. That out of band message queue for the port is then memory mapped into the application's virtual address space such that it may de-queue events without requiring a kernel context switch.

The event queues are registered with the NIC, and there is a control block on the NIC associated with each queue (and mapped into either or both the OS or application's address space(s)).

A queue with control blocks as described in the PCT publication is illustrated in FIG. 1. In the described implementation, the NIC 161 is connected into the host system via a PCI bus 110. The event queue 159 is stored in host memory 160, to which the NIC 161 has access. Associated with the event queue 159 are a read pointer (RDPTR) 162$a$ and a write pointer (WRPTR) 163$a$, which indicate the points in the queue at which data is to be read and written next. Pointer 162$a$ is stored in host memory 160. Pointer 163$a$ is stored in NIC 161. Mapped copies of the pointers RDPTR' 162$b$ and WPTR' 163$b$ are stored in the other of the NIC and the memory than the original pointers. In the operation of the system:

1. The NIC 161 can determine the space available for writing into event queue 159 by comparing RDPTR' and WRPTR, which it stores locally.
2. NIC 161 generates out of band data and writes it to the queue 159.
3. The NIC 161 updates WRPTR and WRPTR' when the data has been written, so that the next data will be written after the last data.
4. The application determines the space available for reading by comparing RDPTR and WRPTR' as accessed from memory 160.
5. The application reads the out of band data from queue 159 and processes the messages.
6. The application updates RDPTR and RDPTR'.
7. If the application requires an interrupt, then it (or the operating system on its behalf) sets the IRQ 165$a$ and IRQ' 165$b$ bits of the control block 164. The control block is stored in host memory 160 and is mapped onto corresponding storage in the NIC. If set, then the NIC would also generate an interrupt on step 3 above.

The event queue mechanism helps improve performance by frequently allowing applications and the OS to poll for new events while they already have context; context switching is reduced by generating interrupts only when required. Bus bottlenecks are also reduced since the host system can retrieve control information more often from the events now in the event queue in host memory, rather than from the NIC directly via the PCI bus.

The use of event queues do not completely eliminate interrupts and context switches, however. In a conventional event queue arrangement, a peripheral device asserts an event for the event queue and then raises an interrupt to activate an event handler. The peripheral device then disables its own further interrupts until the interrupt is acknowledged by the host. The peripheral device can continue asserting events for the event queue, but no further interrupts are asserted. The host event handler, for its part, enters a loop in which it handles the events in the queue iteratively until it believes the queue is empty. The peripheral device may assert additional events for the queue during this time (without a new interrupt), and the host event handler will handle them before de-activating, as long as they arrive before the host event handler determines that the queue is empty. Other context switches may occur for other reasons, but not due to interrupts from the peripheral device. Only when the host event handler determines that the queue is empty, does it acknowledge the interrupt and de-activate. The peripheral device re-enables interrupts in response to the interrupt acknowledge so that it can generate a new interrupt in conjunction with its next-asserted event.

In the management of a single event queue, the above method can reduce interrupt chatter compared to a system in which a new interrupt is asserted for every event. But an additional problem arises in a situation in which one or more peripheral devices can assert events into more than one event queue. The above mechanism can reduce the number of interrupts asserted for each individual one of the event queues, but does nothing to reduce the number of interrupts asserted across all the event queues.

An additional, even more important issue arises where it is desired that some of the event queues be user level queues, under the control of drivers running in user address spaces. Such an arrangement is described in U.K. Patent Application No. GB0408876A0, filed Apr. 21, 2004, entitled "User-level Stack", incorporated herein by reference. In such an architecture, numerous protocol stacks can be supported, each with its own set of transmit and receive data structures, and all assisted by functions performed in hardware on the NIC. But since these drivers are running in user address spaces, they cannot receive interrupts at all. It would be desirable to find a way to support event queues for the user level stacks, complete with the ability of the driver to block when the event queue is empty and be awakened when it contains events, in order to again minimize context switches.

In accordance with an embodiment of the invention, roughly described, an intermediary event queue, which is an interrupting queue, is used to coordinate the interrupts among multiple individual event queues, which need not be interrupting queues. The peripheral device does not raise an interrupt when asserting an event into one of the individual event queues. Instead, if enabled, when the device asserts an event into one of the individual event queues, it also asserts an additional event, referred to herein as a "wakeup" event, into the intermediary event queue. The wakeup event identifies the individual event queue whose handler requires activation. The device then awaits a wake-up event request before it asserts another wakeup event identifying that individual event queue. The peripheral device does assert an interrupt to activate the intermediary queue event handler, in conjunction with the assertion of the wakeup event into the intermediary event queue, but again only if enabled. The device then promptly disables or suppresses further interrupts of the host in conjunction with the assertion of further wakeup events (and optionally other events as well) asserted onto the intermediary event queue. While no further wakeup events will be asserted onto the intermediate event queue identifying the first individual event queue, wakeup events may still be asserted onto the intermediate event queue identifying others of the individual event queues; and the suppression of interrupts will prevent the device from interrupting the host in conjunction with the assertion of those wakeup events.

The interrupt from the peripheral device causes the host to activate its intermediary queue event handler. This event handler, like in the conventional arrangement, enters a loop in which it handles the events in the intermediary event queue iteratively until it believes the queue is empty. The peripheral device may assert additional wakeup events into the intermediary queue during this time, without a new interrupt, and the host intermediary queue event handler will handle them before de-activating, as long as they arrive before the host intermediary queue event handler determines that the queue is empty. Only when the host intermediary queue event handler determines that the queue is empty, does it acknowledge the interrupt and de-activate. The peripheral device re-enables interrupts in response to the interrupt acknowledge so that it can generate a new interrupt in conjunction with the next-asserted wakeup event.

When the host intermediary queue event handler retrieves a user event queue wakeup event from the intermediary queue event queue, it proceeds to activate the host event handler responsible for the event queue identified in the queue wakeup event. That handler then processes the events in the individual event queue iteratively until it believes that individual queue is empty. The peripheral device may assert additional events into the individual event queue during this time, without a new interrupt and without asserting a new wakeup event, and the host individual queue event handler will handle them before de-activating, as long as they arrive before the host individual queue event handler determines that the individual event queue is empty. Only when the host individual queue event handler determines that the queue is empty, does it acknowledge the wakeup event and de-activate. The wakeup event acknowledgment acts as a request for a new wake-up event, so as to enable the peripheral device to generate a new wakeup event in conjunction with the next-asserted event.

It can be seen that the additional layer of indirection offered by sending wakeup events to an intermediary driver for coordination of interrupts, helps to minimize interrupts not only for each event queue individually, but also across all the event queues generally. In addition, the additional layer of indirection allows support of event queues for user level stacks, complete with the ability of the driver to block when the event queue is empty and be awakened when it contains events, in order to minimize context switches.

Separately, in any arrangement in which the host detects an event queue empty condition and then notifies the peripheral device to re-enable its ability to activate the host event handler, a race condition can occur in which the peripheral device asserts one or more additional events into the event queue after the host detects the empty condition but before the peripheral device receives the notification. If this happens, then the host will have de-activated its event queue handler, believing it to be empty, but the peripheral device will not awaken the host event queue handler, trusting the accuracy of the host's notification that all the events that the peripheral device has asserted until that point have been handled.

In order to avoid this race condition, roughly described, the host's notification of an individual event queue empty condition takes the form of the host writing its current host centric individual event queue read pointer to the peripheral device. The peripheral device compares the this read pointer to its own device centric write pointer for the same event queue. If the two are equal, then no race has occurred and the peripheral device simply re-enables its assertion of wakeup events identifying the particular individual event queue. If the two are unequal, however, then a race has occurred. The peripheral device then does not yet re-enable its assertion of wakeup events, but instead asserts into the intermediary event queue a new wakeup event identifying the particular individual event queue. The host handler for the individual event queue can then handle the events that the peripheral device asserted after the host detected the empty condition but before the peripheral device received the notification.

Similarly, in order to avoid a similar race condition taking place with respect to the intermediary event queue, the host's notification of the intermediary event queue empty condition takes the form of the host writing its current host centric intermediary event queue read pointer to the peripheral device. The peripheral device compares the this read pointer to its own device centric write pointer for the intermediary event queue. If the two are equal, then no race has occurred and the peripheral device simply re-enables its assertion of interrupts when wakeup events (or other events) are next asserted onto the intermediary event queue. If the two are unequal, then the peripheral device instead asserts a new interrupt to re-activate the handler for the intermediary event queue. The host handler can then handle the events that the peripheral device asserted into the intermediary event queue after the host detected the empty condition but before the peripheral device received the notification.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 2:
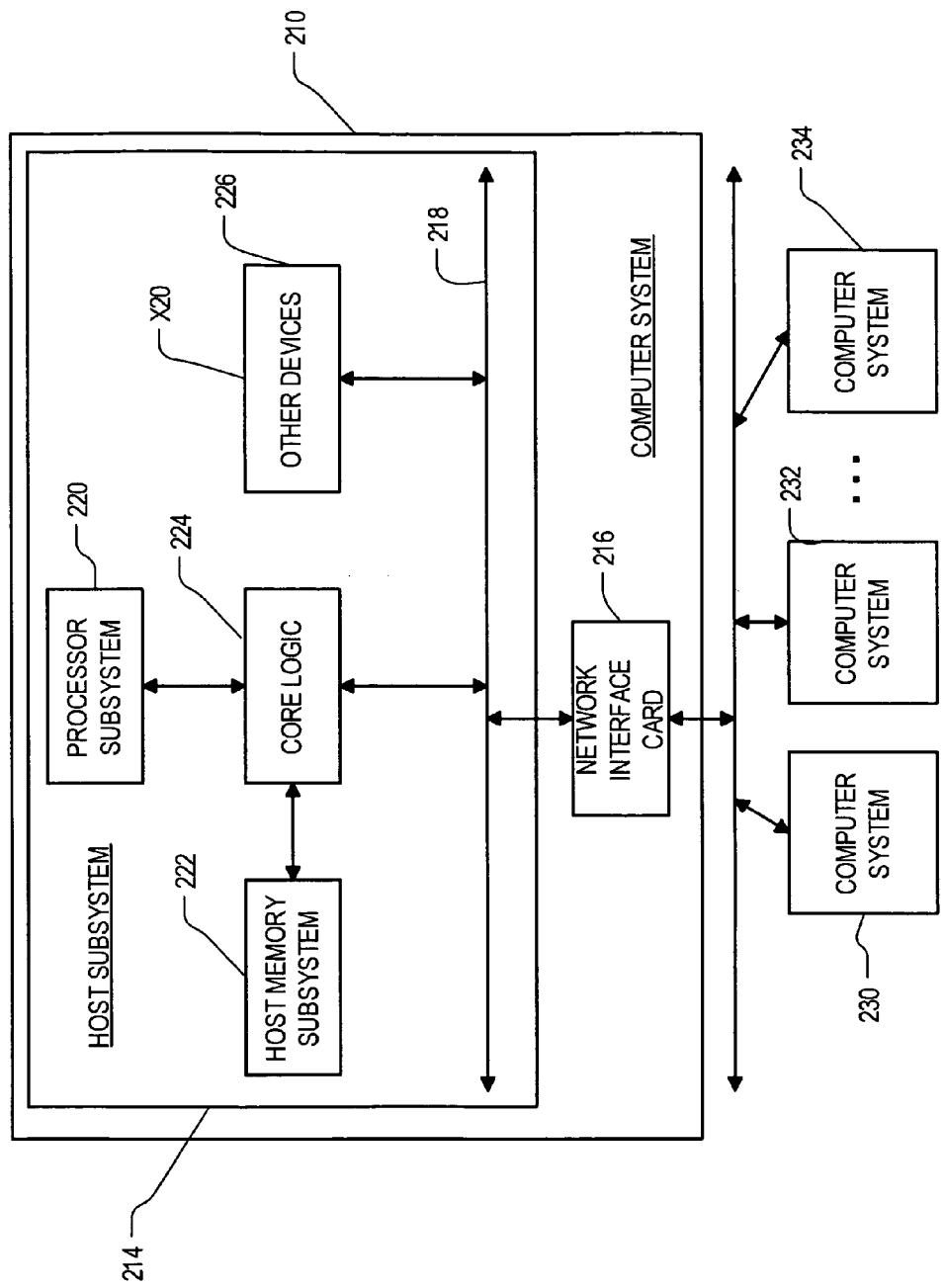
FIG. 2 is a simplified block diagram of a typical computer system incorporating features of the invention.

FIG. 2 is a simplified block diagram of a typical computer system 210 which can communicate via a network 212 with other computer systems such as 230, 232 and 234. Computer system 210 includes a network interface card (NIC) 216 communicating via a communication channel 218 with a host subsystem 214. The host subsystem 224 includes a processor subsystem 220 which includes at least one processor, a host memory subsystem 222, and a core logic subsystem 224. The core logic subsystem 224 provides bridges among the processor subsystem 220, the host memory subsystem 222 and the communication channel 218. The host subsystem 214 may also include other devices 226 in communication with the communication channel 218.

The network interface card 216 provides an interface to outside networks, including an interface to the network 212, and is coupled via network 212 to corresponding interface devices in other computer systems. Network 218 may comprise many interconnected computer systems and communication links. These communication links may be wireline links, optical links, wireless links or any other mechanism for communication of information. While in one embodiment network 218 is the Internet, in other embodiments, network 218 may be any suitable computer network or combination of networks. In and embodiment described herein, network 218 supports an Ethernet protocol.

Host memory subsystem 222 typically includes a number of memories including a main random access memory (RAM) for storage of instructions and data during program execution, and a read only memory (ROM) in which fixed instructions and data are stored. One or more levels of cache memory may also be included in the host memory subsystem 222. For simplicity of discussion, the host memory subsystem 222 is sometimes referred to herein simply as "host memory".

The communication channel 218 provides a mechanism for allowing the various components and subsystems of computer system 210 to communicate with each other. In one embodiment the communication channel 218 comprises a PCI bus. Other embodiments may include other buses, and may also include multiple buses.

Figure 1:
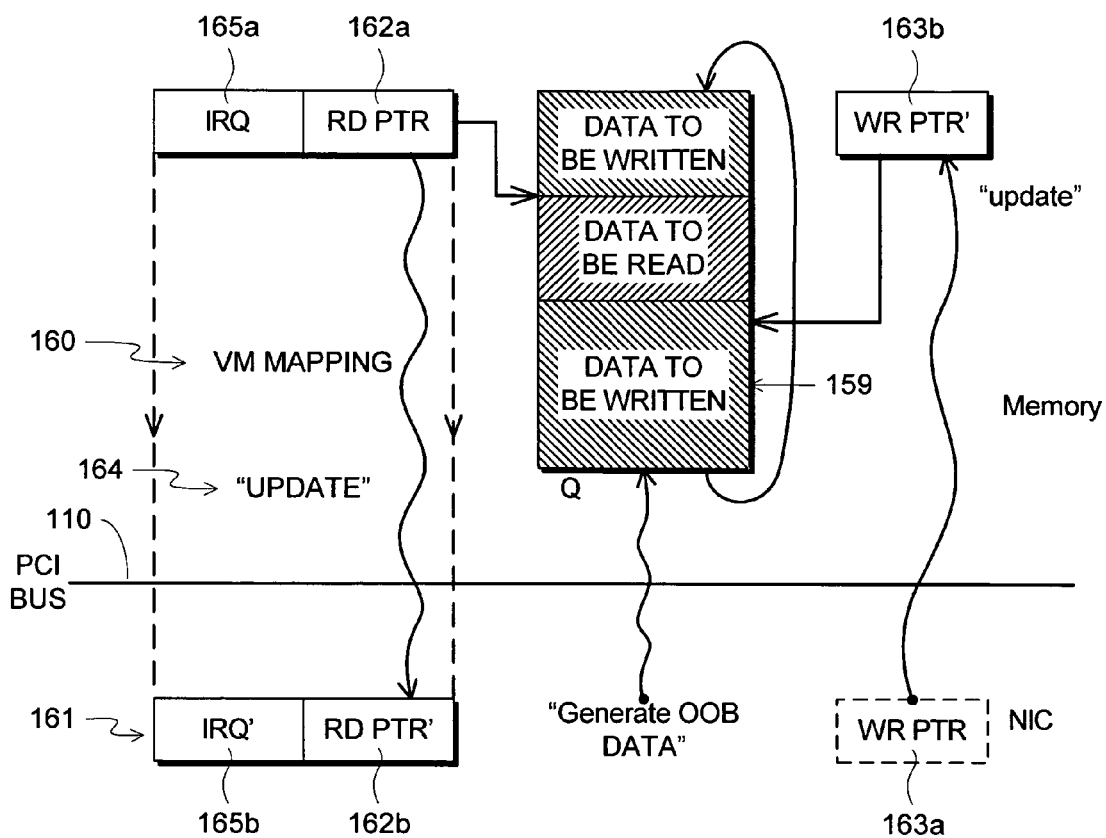
FIG. 1 is a block diagram of a queue with control blocks as described in PCT International Publication No. WO 2004/025477 A2.

Computer system 210 itself can be a varying types including a personal computer, a portable computer, a workstation, a computer terminal, a network computer, a television, a mainframe, a server or any other data processing system or user devices. Due to the ever-changing nature of computers and networks, the description of computer system 210 depicted in FIG. 1 is intended only as a specific example for purposes of illustrating an embodiment of the present invention. Many other configurations of computer system 210 are possible having more or less components, and configured similarly or differently than, the computer system depicted in FIG. 1.

Data Structures, Simplified Embodiment

Figure 3:
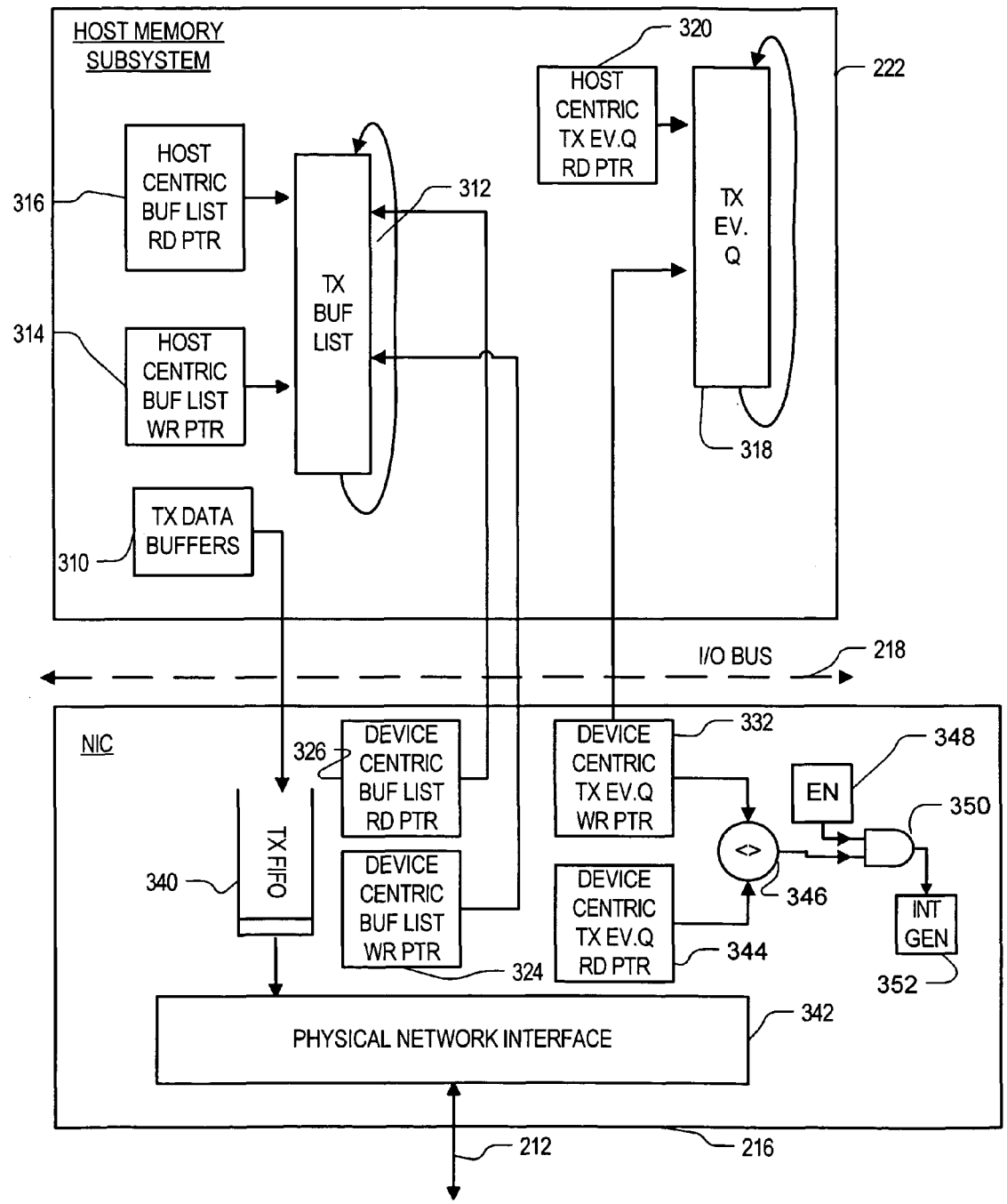
FIG. 3 illustrates a simplified embodiment of a transmit queue according to the invention.
Figure 4:
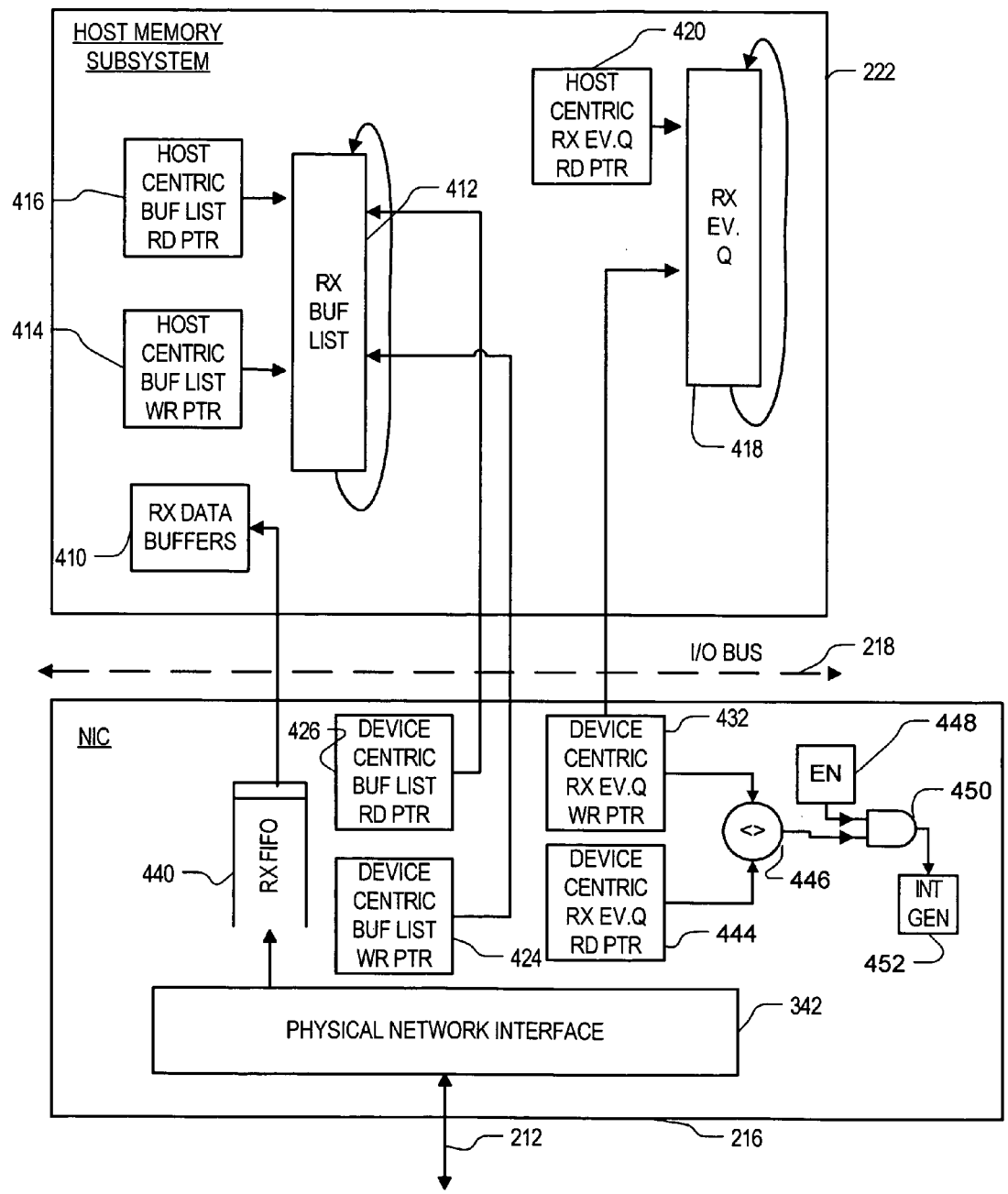
FIG. 4 illustrates a simplified embodiment of a receive queue according to the invention.

FIGS. 3 and 4 illustrate simplified embodiments of the invention, incorporated into the computer system 210 of FIG. 2. In the embodiment of FIG. 3, only a single transmit queue with associated structures is shown, and in the embodiment of FIG. 4, only a single receive queue with associated structures is shown. Both transmit and receive queues are included in a typical implementation, but aspects of the invention can be implemented independently in each. FIGS. 3 and 4 show only the host memory subsystem 222 and the network interface card 216, and only the structures within such components that are pertinent to the present discussion.

Referring first to FIG. 3, the transmit queue is stored in host memory 222 in a series of transmit data buffers 310. The transmit data buffers can be discontiguous within host memory 222, and they are linked together by means of a transmit buffer list 312. The host subsystem 214 writes transmit data buffer descriptors into the transmit buffer list 312 at locations pointed to by a buffer list write pointer 314 in host memory 222, and the NIC 216 reads transmit buffer descriptors from the transmit buffer list 312 at locations pointed to by buffer list read pointer 326 on the NIC 216, corresponding to buffer list read pointer 316 in host memory 222. The transmit buffer list 312 is a "wrap-around" list, meaning that a pointer that consecutively increments beyond the end of the list automatically wraps around to the beginning in a ring-like fashion. If the list has N entries, for example, it can be said that the read and write pointers increment "modulo N". It can also be said that the pointers "modulo increment", the length of the list being implied.

Also associated with the transmit buffer list 312 and the transmit data buffers 310 is a transmit event queue 318, which is also a wrap-around structure. Events are written into the transmit event queue 318 at locations identified by a transmit event queue write pointer 332 on the NIC 216, and are read from the transmit event queue by the host subsystem 214 at locations identified by a transmit event queue read pointer 320 in host memory 222. The system of FIG. 2 uses events as the hardware status reporting method whenever possible, rather than interrupts. In order to improve event delivery latency and overall bus efficiency, events are written out by the NIC 216 into host memory 222 instead of being read by the host subsystem 214 from locations in the NIC 216.

The read and write pointers 314 and 316 into the transmit buffer list 312 are referred to herein as being "host centric", because they represent the state of the queue as viewed by the host subsystem 214. In various embodiments, the host subsystem 214 can compare these pointers in order to detect queue overflow conditions, queue full conditions, or queue high or low watermark conditions, depending on what's needed in the embodiment for queue depth management. The NIC 216 also maintains read and write pointers 324 and 326, respectively, into the transmit data queue 310, as described hereinafter. The read and write pointers 324 and 326 on the NIC are referred to as "device centric" pointers because they represent the state of the queue as viewed by the NIC device 216. In conventional fashion, the host subsystem uses its host centric buffer list write pointer 314 to write into the transmit buffer list 312, modulo-increments the host centric buffer list write pointer 314 after writing, and notifies the NIC to update its device centric buffer list write pointer 324. Similarly, the NIC uses its device centric buffer list read pointer 326 to read from the transmit buffer list 312, modulo-increments the device centric buffer list read pointer 326 after reading, and notifies the host subsystem 214 to update its host centric buffer list read pointer 316. Thus whereas efforts are made to synchronize the host centric buffer list read pointer with the device centric buffer list read pointer, and the host centric buffer list write pointer with the device centric buffer list write pointer, certain points in time may exist during which two pointers in each pair do not exactly match. Importantly, in this simplified embodiment the host subsystem 214 does not maintain a host-centric copy of the transmit event queue write pointer 332. The NIC 216 does maintain a device-centric copy 344 of the transmit event queue read pointer 320, but it is not used for event queue depth management. Instead, it is used for managing the generation of interrupts to the host subsystem to activate a transmit event handler as described in more detail hereinafter.

The NIC 216 further includes a comparator 346 which compares the value in device centric transmit event queue write pointer 332 with the value in device centric transmit event queue read pointer 344. When the two values are unequal, the output of comparator 346 is active. The NIC 216 also includes an interrupt enable register bit 348, and logic 350 which triggers an interrupt generator 352 when both the interrupt enable register bit 348 and the comparator 346 output are active. The operation of the interrupt generation components is described hereinafter.

The NIC 216, in addition to the components already mentioned, also maintains a transmit FIFO 340 into which it writes transmit data that it retrieves from the transmit data buffers 310. Data output from the transmit FIFO 340 is driven onto the network 212 by a physical network interface (PHY) 342.

The network interface card 216 communicates with the host memory 222 via (among other things) an I/O bus 218. I/O bus 218 is preferably a PCI bus, and more preferably the version of PCI known as PCI express. PCI express is described in PCI Special Interest Group, "PCI Express Base Specification 1.0a", Apr. 15, 2003, incorporated herein by reference. Most data (including transmit data from transmit data buffers 310) are communicated via the I/O bus 218 using a direct memory access (DMA) protocol through the core logic subsystem 224, although some communication between the host subsystem 214 and the NIC 216 can involve the processor subsystem 220.

Referring now to FIG. 4, like the transmit queue, the receive queue is stored in host memory 222 in a series of receive data buffers 410. The receive data buffers are linked together by means of a wrap-around receive buffer list 412. When the host subsystem 214 wishes to make additional buffers available for accepting receive data, it writes identifications of the new receive data buffers into the receive buffer list 412 at locations pointed to by a host centric buffer list write pointer 414 in host memory 222. The NIC 216 reads receive buffer descriptors from the receive buffer list 412 at locations pointed to by device centric buffer list read pointer 426 on the NIC 216, corresponding to a host centric buffer list read pointer 416 in host memory 222.

Also associated with the receive buffer list 412 and the receive data buffers 410 is a wrap-around receive event queue 418. Events are written into the receive event queue 418 at locations identified by a receive event queue write pointer 432 on the NIC 216, and are read from the receive event queue 418 at locations identified by a receive event queue read pointer 420 in host memory 222. As with the transmit event queue read and write pointers, in conventional fashion, the host subsystem uses its host centric buffer list write pointer 414 to write into the receive buffer list 412, modulo-increments the host centric buffer list write pointer 414 after writing, and notifies the NIC to update its device centric buffer list write pointer 424. Similarly, the NIC uses its device centric buffer list read pointer 426 to read from the receive buffer list 412, modulo-increments the device centric buffer list read pointer 426 after reading, and notifies the host subsystem 214 to update its host centric buffer list read pointer 416. Importantly, in this simplified embodiment the host subsystem 214 does not maintain a host-centric copy of the receive event queue write pointer 432. As on the transmit side, the NIC 216 does maintain a device-centric copy 444 of the receive event queue read pointer 420, but it is used for managing the generation of interrupts to the host subsystem to activate a receive event handler, instead of for event queue depth management.

The NIC 216 further includes a comparator 446 which compares the value in device centric receive event queue write pointer 432 with the value in device centric receive event queue read pointer 444. When the two values are unequal, the output of comparator 446 is active. The NIC 216 also includes an interrupt enable register bit 448, and logic 450 which triggers an interrupt generator 452 when both the interrupt enable register bit 448 and the comparator 446 output are active.

The NIC 216, in addition to the transmit apparatus of FIG. 3, and the receive side components described above, also maintains a receive FIFO 440 into which it writes data received from the PHY 342. The NIC 216 writes data output from the receive FIFO 440 into the receive data buffers 410 in accordance with the current entry of the receive buffer list 412.

Transmit Queue Operation, Simplified Embodiment

Figure 5:
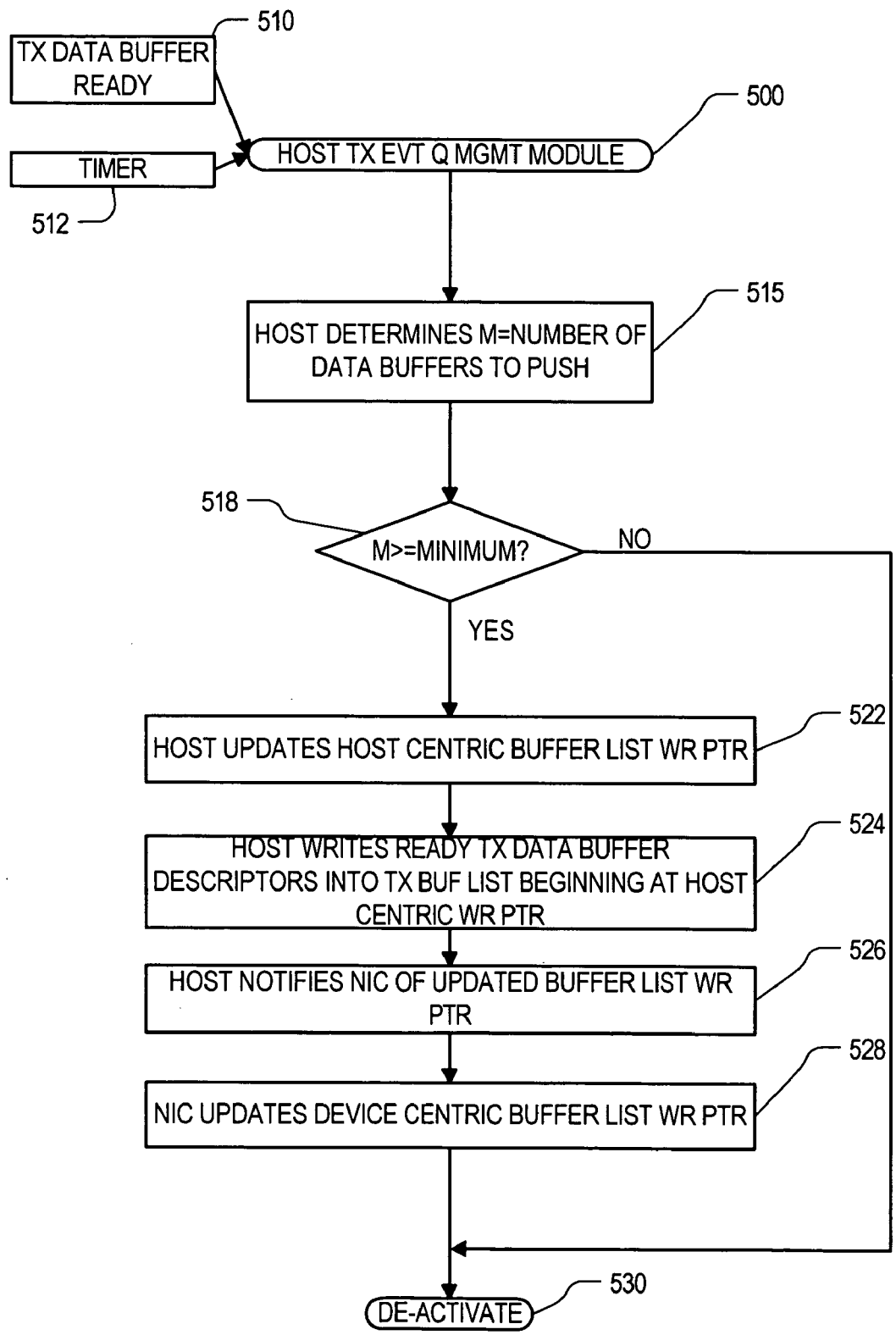
FIGS. 5, 6 and 7 are flowcharts illustrating functions that take place using the structures of FIG. 3.
Figure 6:
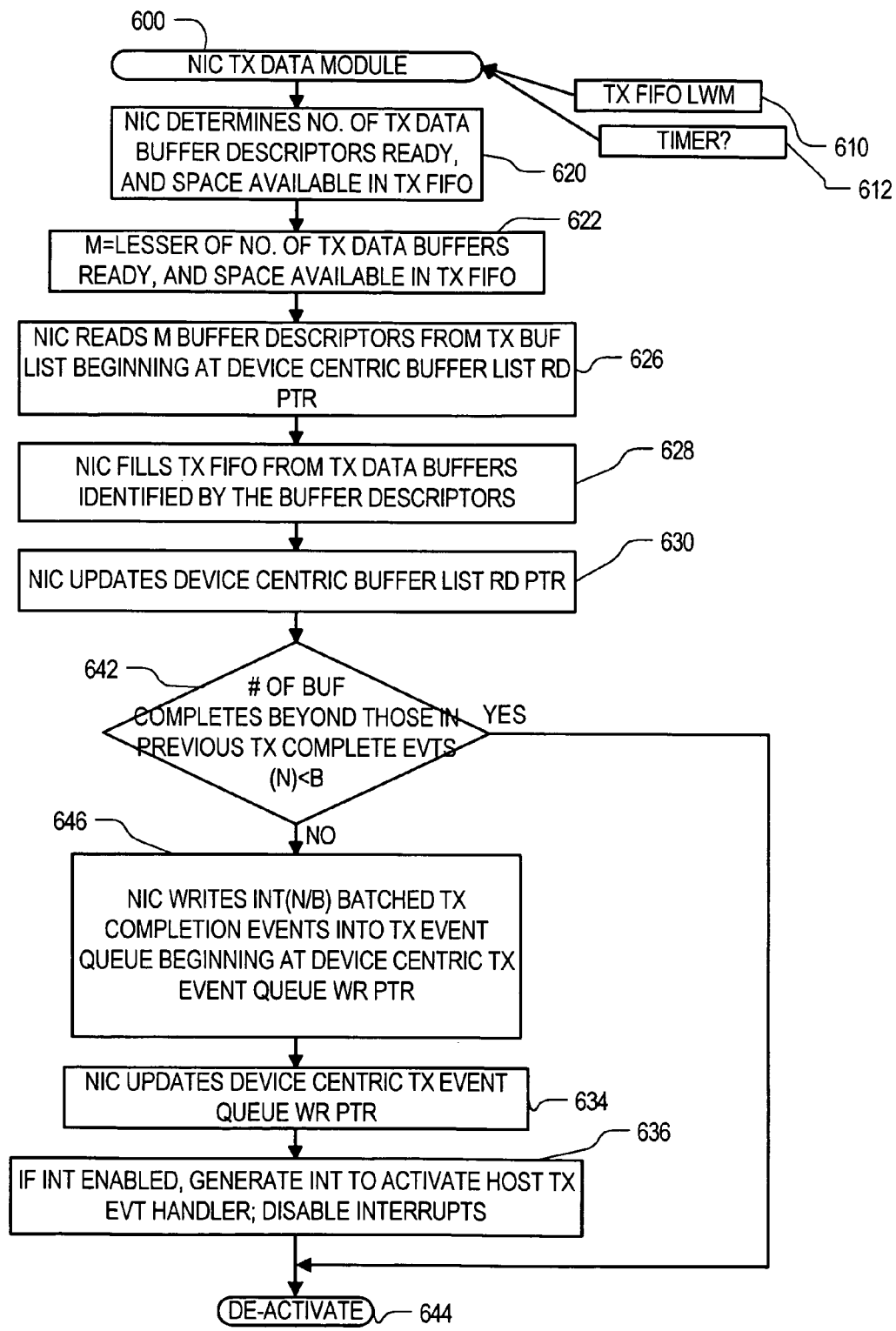
Figure 7:
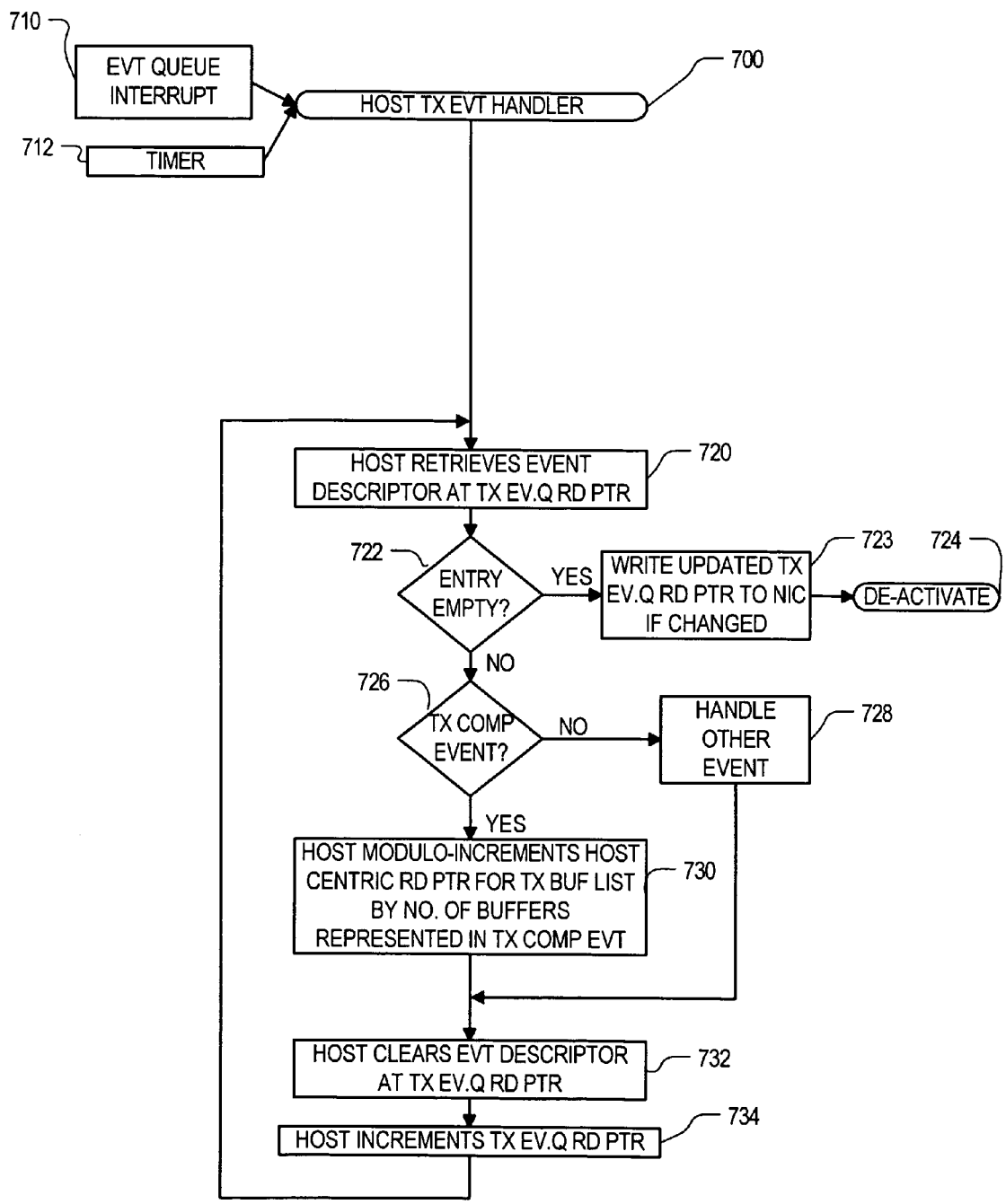

In operation, a number of different functions operate concurrently. FIGS. 5, 6 and 7 are flowcharts illustrating functions that take place for transmitting data using the structures of FIG. 3. As with all flow charts herein, it will be appreciated that many of the steps in these flowcharts can be combined, performed in parallel or performed in a different sequence without affecting the functions achieved. Also, although the functions are described herein as taking place in different "modules", it will be appreciated that an actual implementation need not be "modularized" in the same way, if at all.

In FIG. 5, the host transmit event management module receives an indication from higher level software that one or more new buffers in transmit data buffers 310 are ready for sending (step 510). The module also may be activated periodically on expiration of a polling loop or timer (step 512). In step 515, the host subsystem 214 determines a number 'M', being the number of transmit data buffers to push.

In step 518, it is determined whether M is greater than or equal to some minimum threshold. In one embodiment, the threshold is 1, meaning events for the transmit event queue 318 will be authorized whenever a new transmit data buffer becomes ready for transmission and any space is available in the transmit event queue 318. Authorizing events one by one may add significant additional overhead on the I/O bus 218, however, so in a more preferred embodiment, a larger number is chosen for this threshold. If M is less than the threshold, then the host transmit event queue management module 500 simply goes inactive to await the next activation event (step 530).

If M is greater than or equal to the minimum threshold, then in step 522 the host subsystem 214 updates (modulo-increments) its host centric buffer list write pointer 314 by M entries. In step 524 the host subsystem 214 writes M ready transmit data buffer descriptors into the transmit buffer list 312 beginning at the entry previously (before step 522) designated by the host centric buffer list write pointer 314. In step 526 the host subsystem 214 notifies the NIC 216 of the updated write pointer, and in step 528, the NIC 216 updates its own device centric buffer list write pointer 324. In one embodiment, steps 526 and 528 are combined into a single step in which the host subsystem 214 writes the updated write pointer into a memory mapped location of the device centric transmit buffer list write pointer 324.

In step 530, the host transmit event queue management module goes inactive to await the next activation event.

FIG. 6 is a flowchart illustrating functions initiated on the NIC 216 for transmitting data onto the network 212. The NIC transmit data module 600 is activated on a TX FIFO low watermark (LWM condition 610. It is also activated periodically on selection by a polling loop or expiration of a timer (step 612).

In step 620, the NIC 216 first determines the number of transmit data buffer descriptors that are in the transmit buffer list 312 and ready to be retrieved. This determination is made from a modulo-subtraction of the device centric buffer list read pointer 326 from the device centric buffer list write pointer 324. The NIC is also aware of the space available in its own TX FIFO 340, from its own read and write pointers into TX FIFO 340. In step 622, the NIC determines M, the lesser of the number of transmit ready buffer descriptors and the space available in TX FIFO 340. M is thus the number of transmit data buffer descriptors that can now be copied into TX FIFO 340.

In step 626, the NIC 216 proceeds to read M buffer descriptors from the transmit buffer list 312 beginning at the entry indicated by the device centric buffer list read pointer 326. In step 628, the NIC retrieves data from the buffers in transmit data buffers 310 in host memory, as identified by the buffer descriptors. Since the retrieval of data from transmit data buffers 310 is performed by DMA via the I/O bus 218, the transmit buffer descriptors are sometimes referred to herein as DMA descriptors or DMA commands. The retrieval of the M buffer descriptors themselves also takes place by DMA via the I/O bus 218.

Note that in a different embodiment, the reading of the M buffer descriptors can be interleaved or pipelined with the reading of the transmit data rather than being performed as separate atomic steps. Note also that the retrieval of data from transmit data buffers identified by buffer descriptors already in the FIFO 340 does not await a low watermark or a threshold number of buffers to retrieve. Only the retrieval of buffer descriptors from the transmit buffer list 312 are delayed for batching; and even they are not delayed for batching if the NIC 216 has run out of data to transmit.

In step 630, the NIC updates the device centric buffer list read pointer 326. In an embodiment, the NIC 216 does not explicitly update the corresponding host centric buffer list read pointer 316, since that notification occurs implicitly or explicitly as a result of completion event delivery.

In the embodiment of FIG. 6, each transmit completion event can represent a plurality of data buffer completions. Except in certain less common situations described below, the number of data buffer completions represented by each transmit completion event is a programmable but thereafter fixed number B.

In step 642, the NIC compares N, a value representing the number of transmit buffers that have been retrieved from host memory beyond those already reported in batched transmit completion events written previously to the transmit event queue 318, to B. If N<B, then the NIC transmit data module 600 simply goes to inactive to await the next activation event (step 644). On the other hand, if N>=B in step 642, then in step 646 the NIC 216 writes batched transmit completion events representing (in total) an integer multiple of B transmit data buffers, into the transmit event queue 318 beginning at the entry identified by the device centric transmit event queue write pointer. The number of batched transmit completion events written in step 646 will therefore be the integer part of N/B, and any remainder will not be reported to the host subsystem 214 until the next time such completion events are written.

In an embodiment, the NIC determines N=B and writes a batched transmit completion event whenever the NIC's device centric buffer list write pointer 324 is at an integer multiple of B.

Note that the NIC 216 writes transmit completion events into the transmit event queue 318 upon completion of the data transfers from host memory 222 into the transmit FIFO 340. It does not wait until the data is actually transmitted onto the network 212, since transmission errors typically are not of interest to the higher level application software. Another embodiment might not notify the host subsystem of 'transmit completion' until a subsequent step occurs in the process of transmitting data onto the network, for example completion by the network interface device of the transmission of data onto the network. As used herein, if in a particular embodiment the notification of such a downstream step implies that the NIC has completed the retrieval of data from the transmit data buffers, then such a notification is considered to "include" a step of notifying the host subsystem of completion by the network interface device of the retrieval of data from the transmit data buffers.

If any transmit completion events are written into the transmit event queue 318 in step 646, then in step 634 the NIC 216 correspondingly updates its own transmit event queue write pointer. The updating of the device centric transmit event queue write pointer 332 in step 634 might cause an interrupt to be generated (step 636) to activate the host transmit event handler, discussed with respect to FIG. 7. As can be seen from the logic in FIG. 3, if the device centric transmit event queue write pointer 332 was previously equal to the device centric transmit event queue read pointer 344, then the updating in step 634 will cause the comparator 346 output to transition to an active state. If the interrupt enable bit 348 is active when this occurs, then the interrupt generator 352 will generate the interrupt. If the read and write pointers were previously unequal when the updating in step 634 occurs, then no new interrupt will be generated because the comparator 346 output will already be in the active state. Note that the updating of write pointer 332 can in certain circumstances cause the comparator 346 to transition to an inactive state, in particular if the write pointer had wrapped around and is about to overtake the read pointer. But this is not a situation that logic 350 needs to handle since, as described hereinafter, the algorithm is designed such that the interrupt enable bit 348 will always be inactive should that occur.

After step 636, the NIC transmit data module 600 deactivates (step 644).

FIG. 7 is a flow chart illustrating pertinent functions of a host transmit event handler module 700. Module 700 is activated either on receipt of an interrupt (step 710), generated in step 636 (FIG. 6), or on selection periodically by a polling loop or expiration of a timer (step 712).

In step 720, the host subsystem 214 retrieves the event descriptor at the location in the event queue designated by the transmit event queue read pointer 320. If this new event is in the cleared state (step 722), then the transmit event queue 318 is not yet empty. In step 726, it is determined whether the new event is a transmit completion event. In one embodiment transmit event queue 318 cannot contain any events other than transmit completion events, but in another embodiment it can. Thus if the current event is something other than a transmit completion event, such as a management event, then it is handled in step 728.

If the current event is a transmit completion event, then in step 730, the host subsystem 214 modulo-increments the host centric buffer list read pointer 316 for the transmit buffer list 312 by the number of buffers represented in the current transmit completion event. This is the mechanism by which the host subsystem 214 learns that the NIC 216 has updated its own device centric buffer list read pointer 326. In an embodiment, however, the NIC may specify its updated device centric buffer list read pointer 326 explicitly in the transmit completion event. The latter mechanism may be used either instead of or in addition to the former.

Also in step 730, once the host has incremented the host centric buffer list read pointer 316 beyond a particular transmit data buffer descriptor, it also releases the identified transmit buffer back into a pool. Eventually, after the buffer has been re-filled with new data by higher level software, the host will re-write the data buffer descriptor into the transmit buffer list 312 to queue it again for transmission via the NIC 216.

In step 732, the host subsystem 214 clears the event descriptor at the location in transmit event queue 318 identified by the current transmit event queue read pointer, and in step 734 the host subsystem 214 modulo-increments the transmit event queue read pointer 320. The module then loops back to step 720 to retrieve the next event descriptor, and so on until a cleared entry is retrieved and the module goes inactive (step 724).

If in step 722 it is determined that the retrieved next event descriptor is cleared, then the transmit event queue 318 contains no more events for handling at this time. In step 723, if the host centric transmit event queue read pointer 320 has changed, then as a means of managing event queue interrupts as described in more detail hereinafter, the host writes the updated pointer value into the NIC's device centric transmit event queue read pointer. The host transmit event handler 700 then goes inactive in step 724.

Receive Queue Operation, Simplified Embodiment

Figure 8:
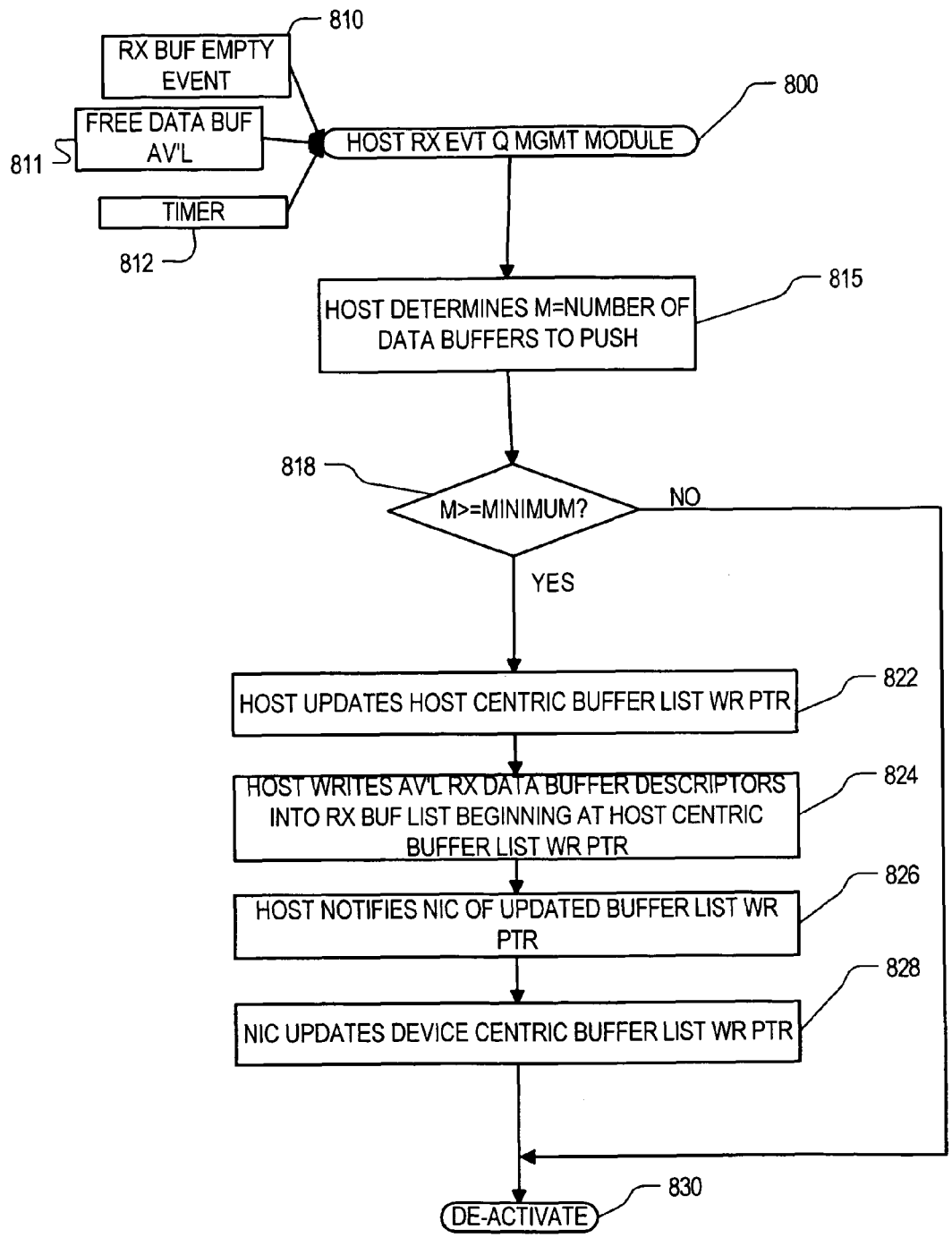
FIGS. 8-11 and 15 are flowcharts illustrating functions that take place for using the structures of FIG. 4.

FIGS. 8-11 are flowcharts illustrating functions that take place for receiving data using the structures of FIG. 4. Receive queue operation is similar in many respects to transmit queue operation as described above, so some aspects of the operation already described will be omitted here. In FIG. 8, the host receive event management module receives an indication from higher level software that a new data buffer in receive data buffers 410 is empty and available for receiving data (step 811). The module is also activated in response to receipt by the host of a receive buffer list empty event (step 810). The module also may be activated periodically on expiration of a polling loop or timer (step 812). In step 815, the host subsystem 214 determines a number 'M', being the number of data buffers to push.

In step 818, it is determined whether M is greater than or equal to some minimum threshold. Preferably the minimum threshold is 1, but in other embodiments a larger number may be chosen for the threshold. If M is less than the threshold, then the host receive event queue management module 800 simply goes inactive to await the next activation event (step 830).

If M is greater than or equal to the minimum threshold, then in step 822, the host subsystem 214 updates (modulo-increments) its host centric buffer list write pointer 414 by M entries. In step 824 the host subsystem 214 writes M available receive data buffer descriptors into the receive buffer list 412 beginning at the entry previously (before step 822) designated by the host centric buffer list write pointer 414. In step 826 the host subsystem 214 notifies the NIC 216 of the updated write pointer, and in step 828, the NIC 216 updates its own device centric buffer list write pointer 424. In one embodiment, steps 826 and 828 are combined into a single step in which the host subsystem 214 writes the updated write pointer into a memory mapped location of the device centric receive buffer list write pointer 424.

In step 830, the host receive event queue management module goes inactive to await the next activation event.

Figure 9:
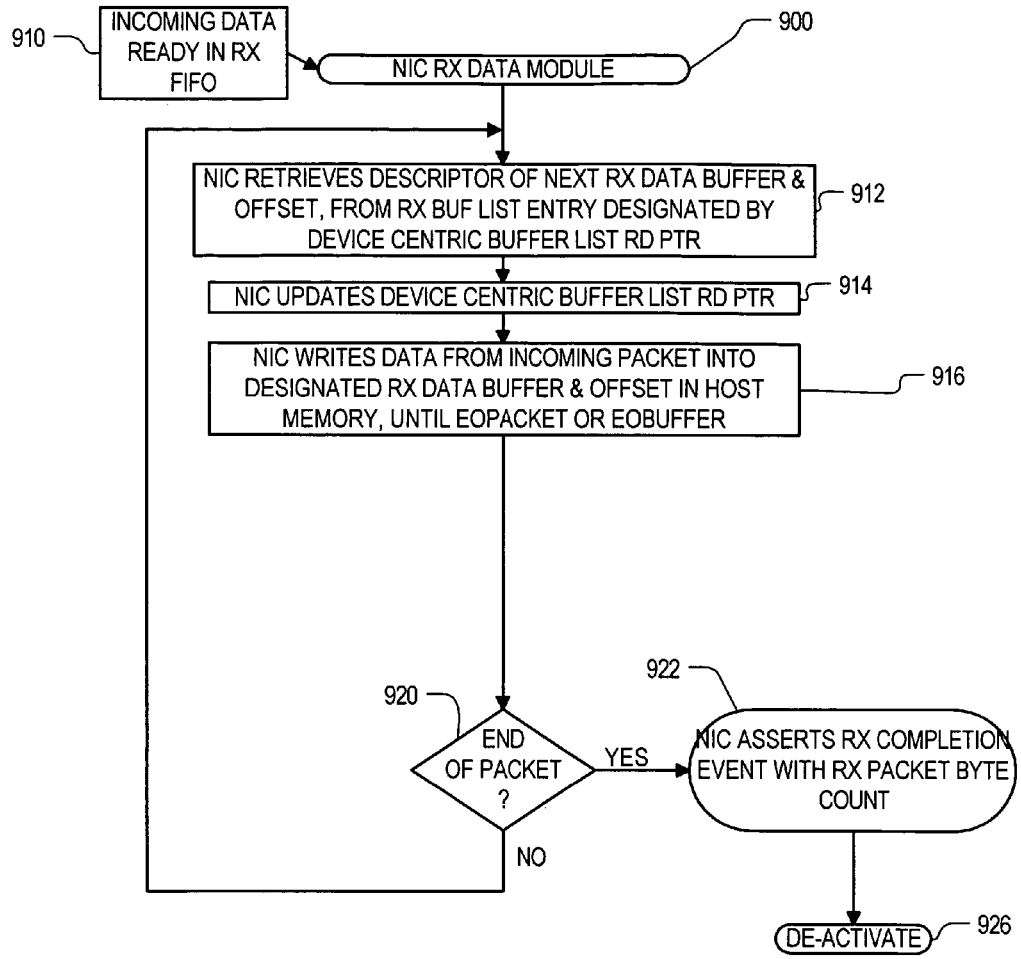

FIG. 9 is a flowchart illustrating functions initiated on the NIC 216 upon receipt of data from the network 212. The incoming data is placed into the RX FIFO 440, and when a high water mark is reached, the NIC receive data module 900 is activated (step 910). Unlike on the transmit side, the NIC 216 does not batch a fixed number of receive data buffer completions into each receive completion event. In one embodiment, however, it does wait to assert a single receive completion event upon completion of a packet, even if the packet occupies more than one receive data buffer.

In step 912, the NIC 216 retrieves the descriptor of the next receive data buffer and offset from the entry of the receive buffer list 412 designated by device centric buffer list read pointer 426. In step 914, the NIC 216 updates (modulo-increments) its device centric buffer list read pointer. The NIC does not at this time notify the host 214 of the new read pointer since that notification will occur implicitly or explicitly through event delivery as described below.

In step 916, the NIC 216 writes data from the incoming packet into the receive data buffer designated by the retrieved descriptor, beginning at the specified offset. Writing continues by DMA until either the end of the current data buffer is reached or the end of the incoming data packet is reached, or both.

In step 920, the NIC determines whether end-of-packet has been reached. If not, then the NIC receive data module 900 returns to step 912 to retrieve the descriptor for the next receive data buffer. No event is asserted to indicate Receive Data Buffer Full in this embodiment. The host 214 will become aware of which receive data buffers are full based on the receive data buffers identified consecutively in the receive buffer list 412, beginning at the host-centric RX queue read pointer.

If step 920 determines that end-of-packet was reached, then in step 922 the NIC 216 asserts a receive completion event to cover all the receive data buffers that contain data from the packet. Note that in this embodiment, only one receive completion event will be asserted even if the packet data spans multiple buffers in receive data buffers 410. Multiple buffers are chained together by consecutive entries in the receive buffer list 412. Note also that if end-of-packet does not coincide with the end of a receive buffer, then the remaining space in the buffer is left unused.

The host (in one embodiment) knows that the receive data buffers covered by the receive completion event are those identified by the descriptors in the receive buffer list 412, beginning with the entry pointed to by the host centric buffer list read pointer 416 and ending before the entry pointed to by the host centric buffer list write pointer 414. In another embodiment, a race condition can be avoided by including an additional field, in the receive completion event descriptor format, to contain a copy of the device centric buffer list read pointer 426 as updated by the NIC 216 in step 914. The host can then determine the receive data buffers covered by the receive completion event as those identified by the descriptors in the receive buffer list 412, between the host centric buffer list read pointer 416 and the device centric buffer list read pointer as reported in the receive completion event.

In yet another embodiment, the NIC supports more than one network port. This embodiment does not batch receive completion events. This embodiment supports both standard size data packets, in which data packets have a relatively small maximum length and the receive data buffers are at least as large as the maximum data packet length, and "jumbo" data packets, in which a data packet can be longer and can span more than one data buffer. A given receive queue is either in standard mode or jumbo mode. If the queue is in standard mode, then absent an error, every receive data buffer filled will contain an end-of-packet, so no receive completion event will indicate completion of more than one data buffer and the problem will not arise. If the queue is in jumbo mode then it is still the case that no receive completion event will indicate completion of more than one data buffer, since the NIC writes a receive completion event for each data buffer it fills. The receive completion event format includes a "RX_Jumbo_Cont" bit which the NIC sets in order to notify the host subsystem that the subject data buffer does not contain an end-of-packet (i.e. there will be a continuation buffer). The receive completion event still includes a copy of the NIC's updated device centric receive buffer list read pointer 426, which now points to the specific descriptor from the receive buffer list 412 for whose data buffer the event indicates completion. The receive completion event format also indicates the NIC port number from which the packet was received.

Returning to the FIG. 9 embodiment, after step 922, once the NIC has asserted a receive completion event, the NIC receive data module 900 then returns to an inactive state (step 926).

Figure 10:
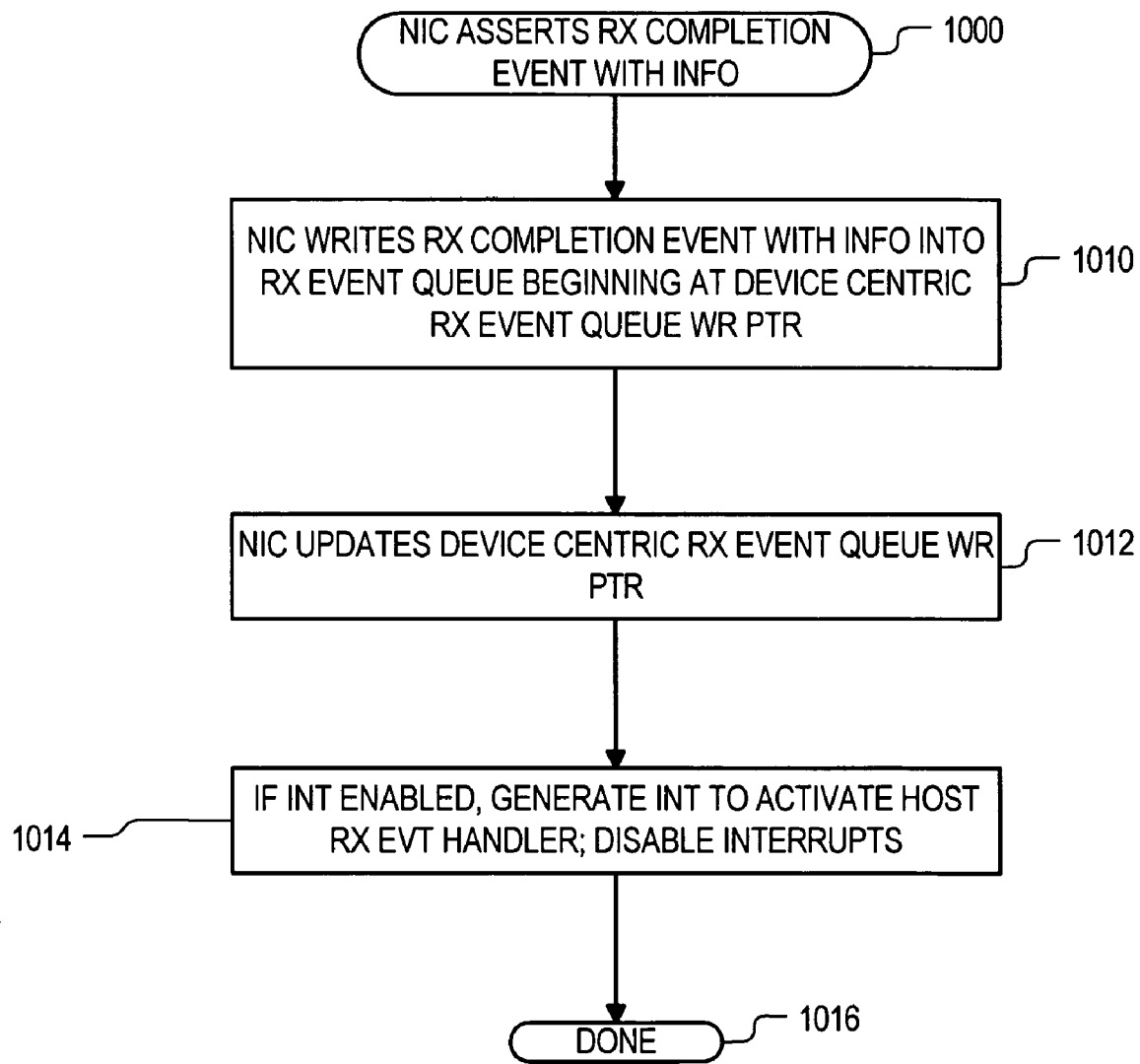

In step 922, the NIC asserts a receive completion event containing certain information. FIG. 10 is a flowchart detail of this step. In step 1010, the NIC 216 writes the receive completion event into the receive event queue 418 beginning at the entry identified by the device centric receive event queue write pointer. In step 1012, NIC 216 correspondingly updates its own receive event queue write pointer.

Figure 11:
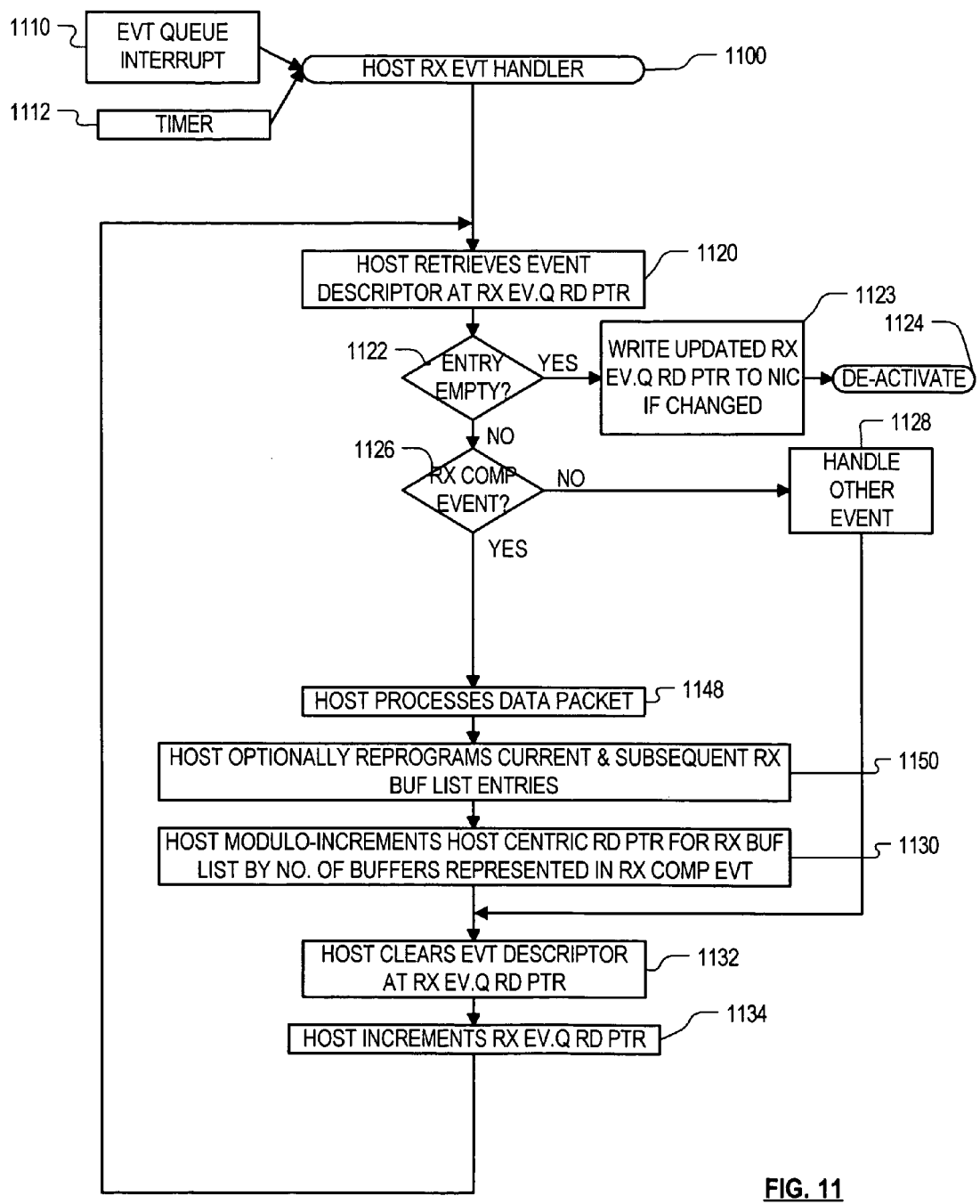

As on the transmit side, the updating of the device centric receive event queue write pointer 432 in step 1012 might cause an interrupt to be generated (step 1014) to activate the host receive event handler, discussed with respect to FIG. 11. As can be seen from the logic in FIG. 4, if the device centric receive event queue write pointer 432 was previously equal to the device centric receive event queue read pointer 444, then the updating in step 634 will cause the comparator 446 output to transition to an active state. If the interrupt enable bit 448 is active when this occurs, then the interrupt generator 452 will generate the interrupt. If the read and write pointers were previously unequal when the updating in step 634 occurs, then no new interrupt will be generated because the comparator 446 output will already be in the active state. As on the transmit side, logic 450 needs to handle a situation in which the updating of write pointer 432 causes the comparator 446 to transition to an inactive state, because the algorithm is designed such that the interrupt enable bit 448 will always be inactive should that occur.

FIG. 11 is a flow chart illustrating pertinent functions of a host receive event handler module 1100. Module 1100 is activated either on receipt of an interrupt (step 1110), generated in step 1014 (FIG. 10), or on selection periodically by a polling loop or expiration of a timer (step 1112).

In step 1120, the host subsystem 214 retrieves the event descriptor at the location in the event queue designated by the receive event queue read pointer 420. If this new event is not in the cleared state (step 1122), then the receive event queue 418 contains events for handling at this time. In step 1126, it is determined whether the new event is a receive completion event. In one embodiment receive event queue 418 cannot contain any events other than receive completion events, but in another embodiment it can. Thus if the current event is something other than a receive completion event, such as a management event, then it is handled in step 1128.

If the current event is a receive completion event, then in step 1148, the host 214 processes the newly received packet data. This may require chaining together several receive data buffers in sequence as designated by consecutive receive buffer list entries. The host 214 knows the starting buffer and offset of the packet from the buffer descriptor in the receive buffer list 412 pointed to by the host centric buffer list read pointer 416, and knows the end of the packet either from the receive packet byte count identified in the receive completion event or from the copy of the device centric buffer list read pointer 426 that might be included in the receive completion event. After processing the packet data in these buffers, the host may release the buffers back into a pool for eventually re-writing into the receive buffer list 412 for re-use by different incoming packet data.

In step 1150, if the higher level software is so designed, the host subsystem 214 may reprogram the receive buffer list 412 entry pointed to by the host centric buffer list read pointer 416 with a descriptor for a new available receive data buffer, and may do the same with respect to all consecutively subsequent receive buffer list entries up to but not including the receive buffer list entry pointing to the beginning of data for the next receive packet. In step 1130, the host subsystem 214 modulo-increments the host centric buffer list read pointer 416 for the receive buffer list 412 by the number of buffers represented in the current receive completion event. This is the mechanism by which the host subsystem 214 learns that the NIC 216 has updated its own device centric buffer list read pointer 426. In an embodiment, however, the NIC may specify its updated device centric buffer list read pointer 426 explicitly in the receive completion event. The latter mechanism may be used either instead of or in addition to the former.

In step 1132, the host subsystem 214 clears the event descriptor at the location in receive event queue 418 identified by the current receive event queue read pointer, and in step 1134 the host subsystem 214 modulo-increments the receive event queue read pointer 420. The module then loops back to step 1120 to retrieve the next event descriptor, and so on until a cleared entry is retrieved and the module goes inactive (step 1124).

If in step 1122 it is determined that the retrieved next event descriptor is cleared, then the receive event queue 418 contains no more events for handling at this time. In step 1123, if the host centric receive event queue read pointer 420 has changed, then the host writes the updated pointer value into the NIC's device centric receive event queue read pointer. The host receive event handler 1100 then goes inactive in step 1124.

Interrupt Management

As mentioned, the NIC 216 maintains a device centric event queue read pointer 344 or 444 for each of the transmit and receive event queues 318 and 418. These read pointers are used for interrupt management as described hereinafter. In one embodiment they are used for interrupt management only at the option of the host subsystem 214. For reasons described below, the host may use the device centric receive event queue read pointer 444 only, leaving the device centric transmit event queue read pointer 344 completely unused. In such an embodiment, the host never does write event queue read pointer updates into device centric transmit event queue read pointer 344 (i.e. step 723 in FIG. 7 is omitted).

Figure 15:
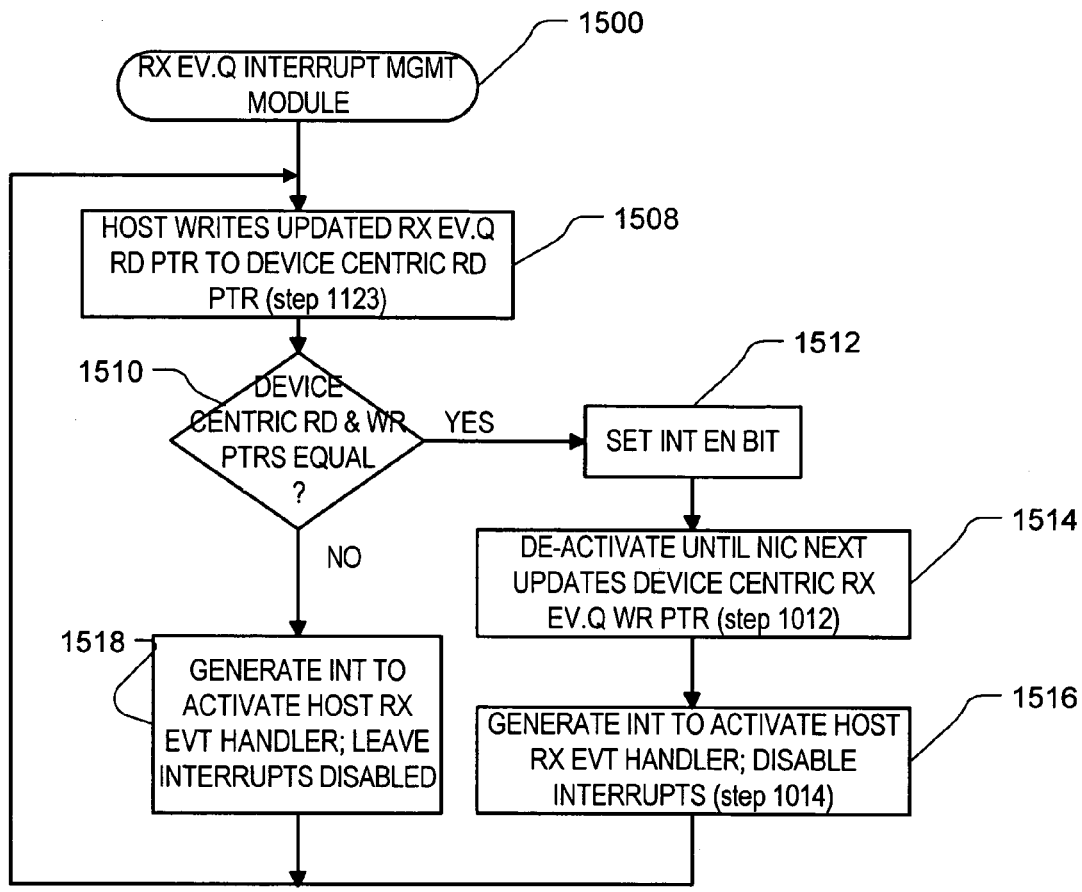

FIG. 15 is a flow chart illustrating the interaction between the host subsystem 214 and the NIC 216 for managing interrupt generation by the NIC 216 for activating the host receive event handler of FIG. 11. The interaction is designed both to minimize the number of interrupts required while also avoiding the possibility of a race condition. Some steps in FIG. 15 duplicate steps that are also part of other flow charts, but collecting them in FIG. 15 will help illustrate their relationship to interrupt management.

In the host receive event handler 1100, after handling one or more receive events that it has retrieved from the receive event queue 418, it may write an updated receive event queue read pointer into the device centric receive event queue read pointer 444 on the NIC 216 (step 1123). This step is shown as step 1508 in FIG. 15. By writing such a value, the host is indicating its view to the NIC that the receive event queue 418 is now empty. If true in the view of NIC 216, then the device centric receive event queue read and write pointers 432 and 434 will now be equal. The NIC thus compares the two values in step 1510 (by comparator 446), and if they are equal, then the NIC also re-enables interrupts for the receive event queue 418 by setting the interrupt enable bit 448 to its active state (step 1512). The re-enabling of interrupts takes place in response to and atomically with the updating of the device centric receive event queue read pointer; the writing of such updated value constitutes a single combined instruction both to update the device centric receive event queue read pointer with the new value, and also to re-enable interrupts. The receive event queue interrupt management module on the NIC 216 then goes inactive (step 1514), with interrupts enabled, until the NIC writes a new receive completion event into the receive event queue 418 (step 1010) and correspondingly updates the device centric receive event queue write pointer 432 in (step 1012). The device centric receive event queue read and write pointers 444 and 432 are now unequal, and in step 1516, since the interrupts are still enabled from step 1512, the NIC receive data module generates an interrupt to activate the host receive event handler of FIG. 11 (as set forth in step 1014). The NIC 216 also atomically disables (suppresses) further receive event queue interrupt generation by resetting interrupt enable bit 448, thereby temporarily to permit the NIC receive data module to write additional events into receive event queue 418 without generating further interrupts. The receive event queue interrupt management module then returns to step 1508, awaiting the next writing by the host of another updated receive event queue read pointer. When that occurs, as previously described, the NIC once again compares the device centric read and write pointers for equality (step 1510), and once again waits with interrupts disabled until the NIC writes another event into the receive event queue 418 (step 1514).

If in step 1510 the NIC 216 determines that the device centric event queue read and write pointers are not equal, then this indicates that the NIC 216 does not share the host's view that the receive event queue 418 is now empty. This might occur, for example, if the NIC was in the process of writing more receive completion events into the receive event queue 418 (step 1010 of the NIC receive data module) while the host was determining, in step 1122 of the host receive event handler, that the next retrieved event descriptor was empty. If this race condition occurs, then the NIC 216 will detect it by determining in step 1510 that the two pointers are not equal (i.e., the device centric receive event queue write pointer 432 is ahead of the device centric receive event queue read pointer 444). The NIC in this situation will leave interrupts disabled, and will immediately generate another interrupt to activate the host receive event handler (step 1518). This will give the host a chance to handle the event that was in process at the time it made the incorrect determination in step 1122 that the receive event queue 418 was empty.

Note that the NIC receive data module might continue to write more events into the receive event queue 418, and if the host receive event handler detects them in step 1122 they will be handled. If any of these additional events remain outstanding when the host next writes an updated receive event queue read pointer to the NIC (step 1123), then this new race condition will again be detected in step 1510 and yet another interrupt will be generated; and so on.

If the event queue interrupt management module is used on the transmit side in a particular embodiment, then the mechanisms described above with respect to the receive event queue interrupt management module (FIG. 15) are implemented similarly for transmit. However, as pointed out above, in another embodiment the interrupt management module is used only on the receive side and not on the transmit side. This is because low latency is desired on the receive side, but not as important on the transmit side. On the transmit side, reduction of interrupts may be more important than prompt receipt of transmit completion events. All the hardware described above for interrupt management can remain on NIC 216 in such an embodiment, but the host transmit event handler 700 never updates device centric transmit event queue read pointer 344. The interrupt enable bit 348 therefore never becomes active, and regardless of the output of read/write pointer comparator 346, the interrupt generator 352 never generates an interrupt. Instead, the host transmit event handler 700 is activated only on expiration of a timer or on selection by a polling loop in the device driver (step 712). This allows the host subsystem to make its own software-based decisions about when and how often to poll for new events in the transmit event queue 418, instead of being governed by NIC-generated interrupts.

In many embodiments, the enabling and disabling of interrupts in steps 1512 and 1516 need not be as gross a function as to apply to the entire peripheral device 216. The functions can be implemented by a masking mechanism, for example. In this sense the terms disablement and enablement are used herein interchangeably with terms such as masking and unmasking of interrupts, and permitting and suppressing interrupts. In addition, since the host event handler typically deactivates after writing its updated event queue read pointer to the NIC 216 (see step 1124, FIG. 11), awaiting a new interrupt to re-activate (step 1110), the writing of the event queue read pointer can also be thought of as an interrupt request. No distinction is made herein between the enablement interrupts and an interrupt request.

Multiple Queue Embodiment

The invention is especially useful in a network interface architecture in which portions of the protocol stack are located both in the operating system kernel and in the transport library for invoking directly by a user-level application. An example of such an architecture is described in U.K. Patent Application No. GB0408876A0, filed Apr. 21, 2004, entitled "User-level Stack", incorporated herein by reference. In such an architecture, numerous protocol stacks can be supported, each with its own set of transmit and receive data structures, and all assisted by functions performed in hardware on the NIC.

Figure 12:
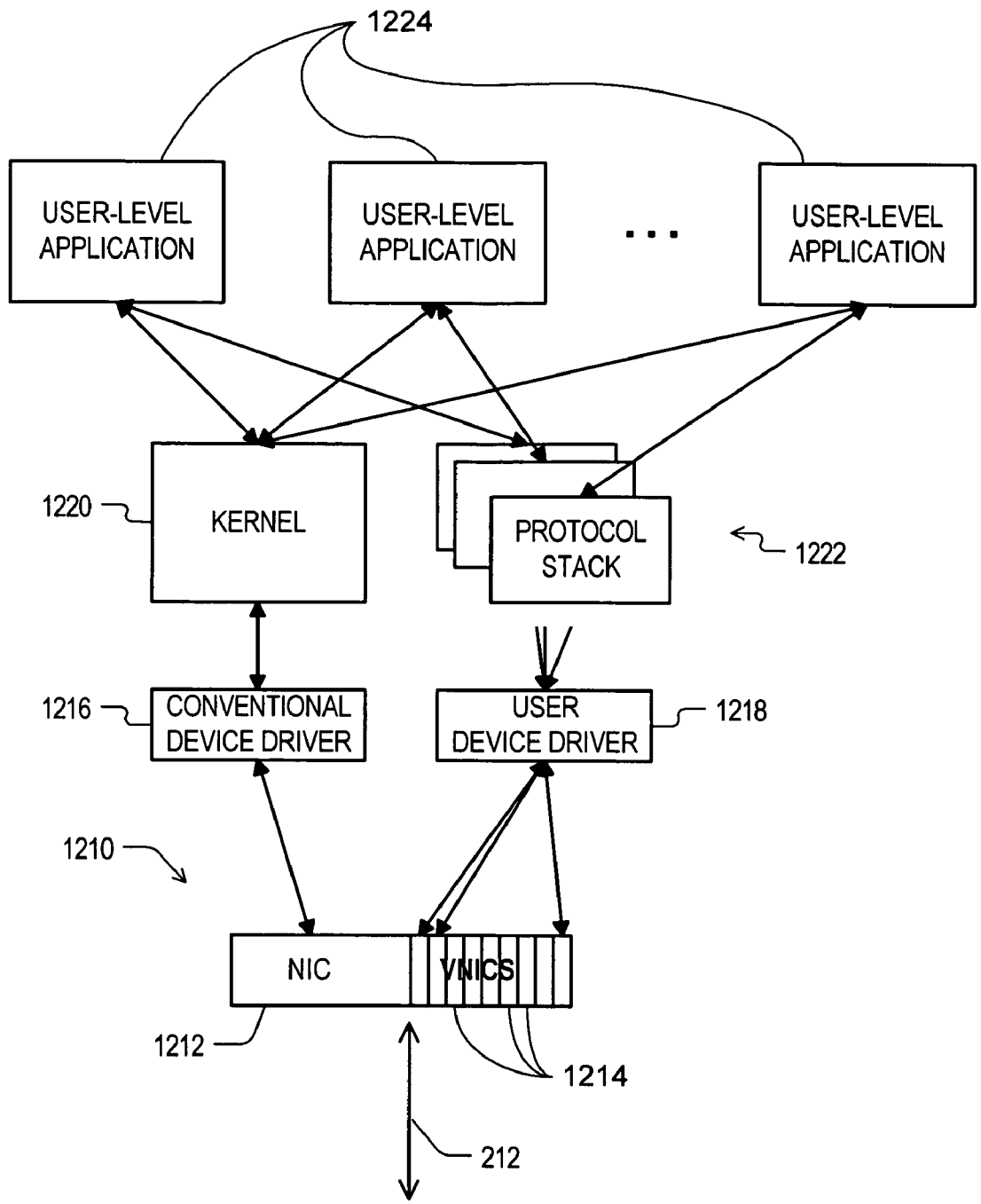
FIG. 12 is a simplified block diagram of another system incorporating aspects of the invention.

FIG. 12 is a simplified block diagram of a system in which multiple protocol stacks are supported with hardware assist on a NIC 1210. The NIC 1210 includes not only a conventional hardware NIC portion 1212, but also a plurality of "virtual" NIC portions (VNICs) 1214. The NIC 1210 appears to the operating system as a dual function device having two device drivers: a conventional device driver 1216, in communication with the conventional NIC portion 1212, and a user device driver 1218 in communication with the VNICs 1214. Generally speaking, the conventional device driver 1216 is used by the conventional protocol stack (not shown) in the kernel 1220, and the user device driver 1218 is used by each of a plurality of user level protocol stacks 1222. A separate user-specific protocol stack 1222 is created for each of a plurality of user level applications (or processes) 1224. User level applications can communicate with the network 212 via calls to the kernel 1220, but preferably they do so via their respective user level protocol stacks 1222.

The system of FIG. 12 is more complex than that of FIGS. 3 and 4, but with respect to each individual transmit or receive queue, the operation is similar. The primary difference between the two embodiments derives from the increased complexity in the FIG. 12 embodiment of keeping track of the characteristics and state of the multiple queues. Pertinent details of these differences will now be described.

Figure 13:
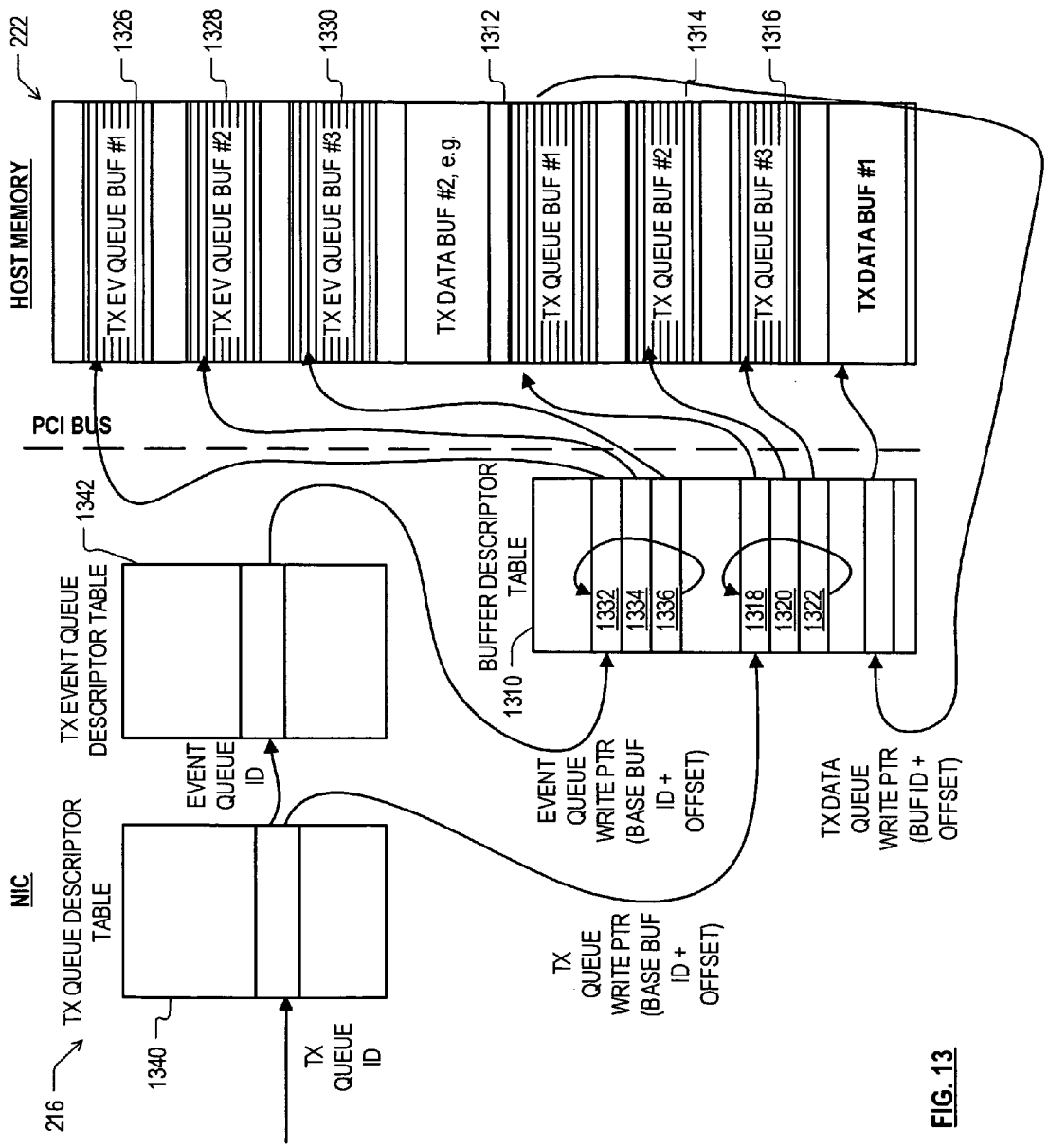
FIG. 13 is a block diagram of certain data structures used by the system of FIG. 12 in support of transmit queues.

FIG. 13 is a block diagram of various data structures used by the system of FIG. 12 in order to support separate transmit queues for each of the VNICs 1214. The diagram indicates which structures exist in host memory 222 and which exist on the NIC 216. The transmit data buffers 310, transmit buffer list 312 and transmit event queue 318 for all the transmit queues are all resident in host memory 222 and made up of generalized buffers which can be discontiguous and interspersed with each other in host memory 222. In FIG. 13, the buffers making up the transmit data buffers 310 are identified as "TX DATA BUF #n", and the buffers making up the transmit buffer list 312 are identified as "TX QUEUE BUF #n". The buffers making up the transmit event queue 318 are identified as "TX EV QUEUE BUF #n".

Individual buffers may be either 4 k or 8 k bytes long in one embodiment, and they are chained together into logically contiguous sequences by means of physically contiguous descriptors in a buffer descriptor table 1310. For example, one transmit queue (transmit buffer list 312) might occupy buffers 1312, 1314 and 1316 in host memory 222, which are discontiguous and possibly out-of-order regions of memory. They are chained together into a single logically contiguous space by the physically contiguous entries 1318, 1320 and 1322 in the buffer descriptor table 1310. The entries 1318, 1320 and 1322 are written and managed by the host 214 and are viewed as a wrap-around ring. So for example, if the host wishes to define a transmit buffer list 312 having 64 k entries for transmit data buffer descriptors, and each buffer is 4 k in size, then the host will allocate a physically contiguous sequence of 16 entries in buffer descriptor table 1310 for this transmit buffer list. Similarly, one transmit event queue 318 might occupy buffers 1326, 1328 and 1330 in host memory 222. These buffers are discontiguous and possibly out-of-order in host memory, but are chained together into a single logically contiguous wrap-around space by the physically contiguous entries 1332, 1334 and 1336 in the buffer descriptor table 1310. The buffer descriptor table 1310 is indexed by "buffer ID", and each of its entries identifies, among other things, the base address of the corresponding buffer in host memory 222.

In order to keep track of the state of each of the transmit buffer lists and transmit event queues for the many user-level applications that might be in communication with LAN 212 at the same time, the NIC 216 includes a transmit queue descriptor table 1340 and an event queue descriptor table 1342. Each transmit queue (including its transmit data buffers, its transmit buffer list and its transmit event queue) has a corresponding transmit queue ID, which is used as an index into the transmit queue descriptor table 1340. The designated entry in the transmit queue descriptor table 1340 is the starting point for describing the state and other characteristics of that particular transmit queue, as viewed by the NIC 216. Each such entry identifies, among other things:

whether the queue is a kernel queue, user queue or another kind of queue;

the size of the transmit buffer list 312 (number of transmit data buffer descriptors it can contain)

the ID of the transmit event queue associated with this transmit queue;

a queue "label" to be returned to the event queue as part of a transmit completion event;

buffer ID of base buffer in the transmit buffer list 312 for this transmit queue;

device centric read and write pointers 326 and 324 into the transmit buffer list 312 for this transmit queue In order to retrieve current transmit data from a particular transmit queue in host memory 222, the NIC 216 first uses the ID of the particular transmit queue to look up, in the transmit queue descriptor table 1340, the buffer ID of the base buffer containing the transmit buffer list 312 of the particular transmit queue. The NIC 216 also obtains from the same place, the current device centric buffer list read pointer 326 into that transmit buffer list 312. It then uses the base buffer ID as a base, and the device centric buffer list read pointer high order bits as an offset, into the buffer descriptor table 1310, to obtain the base address in host memory 222 of the buffer that contains the particular transmit buffer list 312. The NIC then uses that base address as a base, and the device centric buffer list read pointer low order bits times the number of bytes taken up per descriptor as an offset, to retrieve from host memory 222 the current entry in the particular transmit buffer list 312. Note that in order to reduce accesses to host memory 222, in one embodiment the NIC 216 caches parts of the transmit buffer lists 312.

The current entry in the particular transmit buffer list 312 contains, among other things:
- the buffer ID of the current transmit data buffer;
- a byte offset into the current transmit data buffer; and
- a number of bytes to be transmitted from the current transmit data buffer.

The NIC 216 then uses the buffer ID of the current transmit data buffer as another index into buffer descriptor table 1310 to retrieve the buffer descriptor for the buffer that contains the current transmit data. Note this buffer descriptor is an individual entry in buffer descriptor table 1310; unlike the descriptors for buffers containing transmit queues or transmit event queues, this buffer descriptor is not part of a ring. The NIC 216 obtains the physical address in host memory 222 of the current transmit data buffer, and then using that physical address as a base, and the byte offset from the transmit buffer list entry as an offset, it determines the physical starting address in host memory 222 of the current data to be transmitted.

The transmit queue descriptor table 1340 entry designated by the transmit queue ID, as previously mentioned, also contains the ID of the transmit event queue associated with the particular transmit queue. All of the transmit event queues for all the applications 1224 are described by respective entries in the transmit event queue descriptor table 1342. The entry in the transmit event queue descriptor table 1342 identified by the transmit queue ID from the transmit queue descriptor table 1340 is the starting point for describing the state and other characteristics of that particular transmit event queue 318, as viewed by the NIC 216. Each such entry identifies, among other things:
- the size of the particular transmit event queue 318;
- the buffer ID of base buffer making up the particular event queue 318;
- a char_ev_enable bit corresponding to the interrupt enable bit 348 of FIG. 3;
- the transmit event queue write pointer 332 for the particular event queue 318; and
- the transmit event queue read pointer for the particular event queue 318.

Thus in order to write an event into the transmit event queue 318 associated with a particular transmit queue, the NIC 216 uses the transmit event queue ID obtained from the respective entry in the transmit queue descriptor table 1340, to look up, in the transmit event queue descriptor table 1342, the buffer ID of the base buffer containing the transmit event queue 318 of the particular transmit queue. The NIC 216 also obtains from the same place, the current transmit event queue write pointer 332 into that transmit event queue 318. It then uses the base buffer ID as a base, and the transmit event queue write pointer high order bits times the number of bytes taken up per descriptor as an offset, into the buffer descriptor table 1310, to obtain the base address in host memory 222 of the buffer that contains the current entry of the particular transmit event queue 318. The NIC then uses that base address as a base, and the transmit event queue write pointer low order bits as an offset, to write the desired event descriptor into the current entry in host memory 222 of the particular transmit event queue 318.

Note that as illustrated in FIG. 13, whereas each slot (e.g. 1332, 1334, 1318) shown in the buffer descriptor table 1310 represents a single descriptor, each slot (e.g. 1326, 1328, 1314) in the host memory 222 represents a memory "page" of information. A page might be 4 k or 8 k bytes long for example, so if a transmit data buffer descriptor in a transmit queue occupies either 4 or 8 bytes, then each slot 1312, 1314 or 1316 as shown in FIG. 13 might hold 512, 1 k or 2 k transmit data buffer descriptors.

Figure 14:
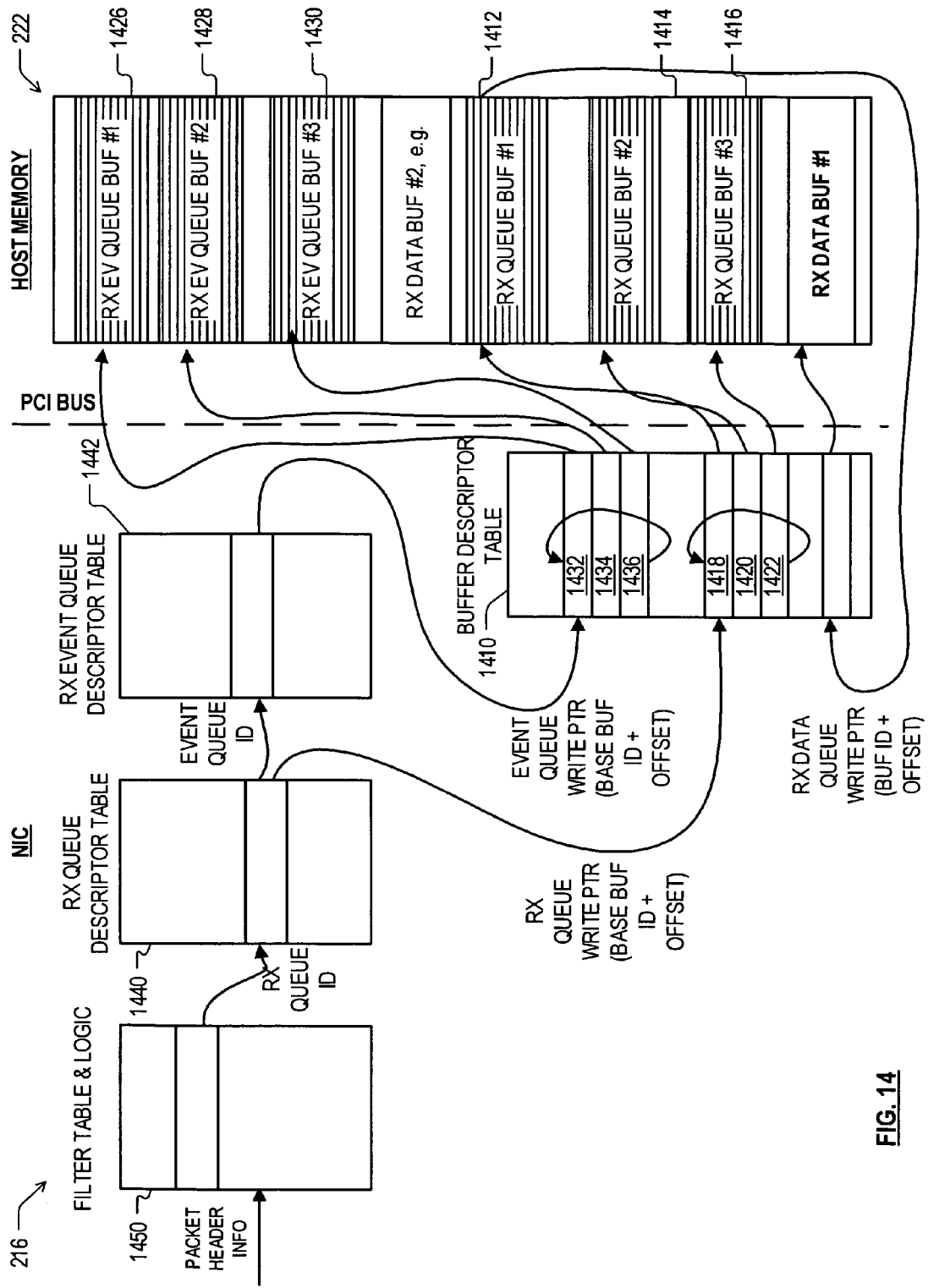
FIG. 14 is a block diagram of certain data structures used by the system of FIG. 12 in support of receive queues.

FIG. 14 is a block diagram of various data structures used by the system of FIG. 12 in order to support separate receive queues for each of the VNICs 1214. The diagram is similar to that on the transmit side, and some of the similar features will not be described here again.

As on the transmit side, the receive data buffers 410, receive buffer list 412 and receive event queue 418 for all the receive queues are all resident in host memory 222 and made up of generalized buffers which can be discontiguous and interspersed with each other in host memory 222. In FIG. 14, the buffers making up the receive data buffers 410 are identified as "RX DATA BUF #n", and the buffers making up the receive buffer list 412 are identified as "RX QUEUE BUF #n". The buffers making up the receive event queue 418 are identified as "RX EV QUEUE BUF #n". Preferably, the transmit and receive event queues 318 and 418 for all protocol stacks are combined into one overall pool of event queues. That is, preferably, the transmit and receive event queue descriptor tables 1342 and 1442 are implemented as only a single table.

Also as on the transmit side, individual buffers may be chained together into logically contiguous sequences by means of physically contiguous descriptors in a buffer descriptor table 1410. The buffer descriptor table 1410 is indexed by "buffer ID", and each of its entries identifies, among other things, the base address of the corresponding buffer in host memory 222.

In order to keep track of the state of each of the receive buffer lists and receive event queues for the many user-level applications that might be in communication with LAN 212 at the same time, like the transmit queue descriptor table 1340, the NIC 216 includes a receive queue descriptor table 1440 and an event queue descriptor table 1442. Each receive queue (including its receive data buffers, its receive buffer list and its receive event queue) has a corresponding receive queue ID, which is used as an index into the receive queue descriptor table 1440. The designated entry in the receive queue descriptor table 1440 is the starting point for describing the state and other characteristics of that particular receive queue, as viewed by the NIC 216. Each such entry identifies roughly the same information about the receive queue as described above with respect to an entry in transmit queue descriptor table 1340.

The receive queue descriptor table 1440 entry designated by the receive queue ID, as previously mentioned, also contains the ID of the receive event queue associated with the particular receive queue. All of the receive event queues for all the applications 1224 are described by respective entries in the receive event queue descriptor table 1442. The entry in the receive event queue descriptor table 1442 identified by the receive queue ID from the receive queue descriptor table 1440 is the starting point for describing the state and other characteristics of that particular receive event queue 418, as viewed by the NIC 216. Each such entry identifies roughly the same information about the receive event queue as described above with respect to an entry in transmit event queue descriptor table 1342. As on the transmit side, at least for event queue depth management purposes, this information does not need to include a device centric receive event queue read pointer for any receive event queue 418.

In addition to the structures on the receive side which correspond to those on the transmit side, the receive side also includes a filter table and logic block 1450. Because the NIC 216 can support multiple simultaneous connections between user-level applications 1224 and remote agents on LAN 212, and because the NIC 216 supports these using multiple transmit and receive queues, one function performed by the NIC 216 is to direct each incoming data packet to the correct receive queue. The mechanisms used by NIC 216 to make this determination are not important for an understanding of the invention, except to note that filter table and logic 1450 maintains a correspondence between packet header information and destination receive queue ID. The filter table and logic 1450 thus uses the header information from the incoming packet to determine the ID of the proper destination receive queue and uses that receive queue ID to index into the receive queue descriptor table 1440. As explained above with respect to the transmit side, the receive queue ID is the starting point for the NIC 216 to obtain all required information about the destination receive queue for proper forwarding of the packet data.

Management Events

As mentioned, events are used as the primary status reporting method in the embodiments described herein. Events are status words gathered from various sources in the NIC 216. Events can generate interrupts as described above with respect to the simplified embodiment, but as described below the generation of interrupts in the embodiment of FIGS. 12-14 includes an additional level of indirection. Interrupts are minimized to reduce interrupt latency and CPU overhead.

Also as mentioned, the transmit and receive event queue descriptor tables 1342 and 1442 preferably are implemented as only a single table. In one such embodiment, the unified event queue supports up to 4 k event queues. Event queues 0-3 are dedicated to a maximum of four queues used for packet transfer for a kernel network interface driver (known as the NET driver) and event queue 4 is dedicated to a second kernel driver (known as the CHAR driver) which is responsible for overall management and coordination between all the user queues and their corresponding protocol stacks.

Events are of different types, as identified by an event code field in the event descriptor. The remaining fields of the event descriptor depend on the event type. Two event types already described are transmit completion events and receive completion events; As previously described these are sent to any event queue as programmed in the transmit or receive queue descriptor table 1340 or 1440, respectively. Other event types are specific to other non-IP LAN protocols. Each event queue also has an associated timer in the NIC 216, and these timers can also generate events for their respective event queues. Certain events, including most management events, are strictly CHAR driver events. These events are sent only to the CHAR driver and not to any of the user event queues. Still other events are global events that either the CHAR driver or a kernel driver may be responsible for handling. Events can also be generated by either the CHAR driver or the NET driver. The CHAR and NET drivers can generate events of any desired type for any event queue.

The NIC 216 uses a single event FIFO (not shown) for buffering up events waiting to be written out to memory. The depth of event FIFO is small to ensure low latency delivery. When this FIFO is full, all agents get back-pressured.

Shared Event Queue Embodiment

In the embodiments of FIGS. 3, 4, 13 and 14, a separate event queue is shown for each of the transmit and receive data queues. In a preferred embodiment, however, the host subsystem 214 can designate a single event queue to receive events regarding a number of different data queues. The data queues assigned to a single event queue can be transmit queues, receive queues or both. For example, the host subsystem might be running a program thread that acts as an endpoint for several bundles of TCP connections on the network 212. The thread typically would have a separate transmit queue and a separate receive queue for each connection bundle, but typically would have only one event queue for receiving events related to all such transmit and receive queues. As another example, one program thread might have more than one event queue, or several program threads might share one event queue. All such variations are supported. In addition, in a multiple queue embodiment, the transmit and receive event queue descriptor tables such as 1342 and 1442 preferably are implemented as only a single table as well.

As mentioned, the entry in the queue descriptor table 1340 or 1440 for a particular data queue (transmit or receive, respectively) includes a field identifying the event queue ID into which events relevant to the particular queue should be written. When the NIC 216 consumes transmit or receive data buffers from the particular data queue, and wishes to write a completion event into the appropriate event queue, the NIC 216 retrieves the appropriate event queue ID from this field in the queue descriptor table entry for the particular data queue. The entry in the queue descriptor table for a particular data queue also includes a queue "label", which the NIC 216 will include as data in the completion event descriptor. Typically the program thread that is responsible for the particular data queue will write a code into this label field that the thread can later use (upon receiving a completion event) to identify the particular data queue ID to which the event pertains.

Interrupt Management in Multiple Queue Embodiment

In the multiple queue embodiment, interrupts for the NET kernel queues are managed as described above with respect to the simplified embodiment. Depending on the hardware, either each kernel queue has its own interrupt or two or more of them share an interrupt. In the latter case, the shared interrupt activates all sharing drivers, each of which quickly determines whether it is the one responsible for handling the interrupt. The CHAR driver can also share an interrupt with one or more of the NET queues.

The user queues, however, are not part of the operating system and cannot receive interrupts. In an aspect of the invention, similar functions can be accomplished by the addition of one layer of indirection. In particular, in step 636 (for transmit) and 1014 (for receive), the respective NIC transmit and receive data modules do not directly interrupt the respective transmit and receive event handlers in the host. Instead, they write a "user event queue wakeup event", which includes a field identifying (by event queue ID) the event queue that requires activation, into the event queue of the CHAR driver. In the simplified embodiment, interrupts were qualified by an interrupt enable bit 348, 448; in the multiple queue embodiment, the writing of user event queue wakeup events into the event queue of the CHAR driver is qualified by the char_ev_enable bit in the event queue descriptor for the user level event queue that requires activation.

The CHAR driver queue is unlike the user level queues in the sense that it ignores its char_ev_enable bit, and is unlike the simplified embodiment in that its event queue contains wakeup events referring to another queue's driver rather than data transfer completion events (although in an embodiment the CHAR driver event queue can contain data transfer completion events as well). The CHAR driver queue is similar to the simplified embodiment in that it still includes an interrupt enable bit on the NIC. The enablement and disablement of interrupts using this bit operates substantially as set forth above with respect to FIGS. 3 and 4.

Accordingly, in conjunction with the writing of a user event queue wakeup event into the CHAR driver event queue, the NIC 216 generates an interrupt to the CHAR driver running in the host subsystem 214 only if CHAR driver interrupts are then enabled. The interrupt enable bit for the CHAR driver queue is then promptly turned off, so that further user event queue wakeup events written into the CHAR event queue will not generate interrupts. (Nor will other kinds of events written to the CHAR event queue.) Stated another way, the CHAR event queue will not generate further interrupts until the CHAR driver requests one. However the NET driver queue may still be able to generate interrupts since all interrupting event queues operate in an independent manner. As set forth above with respect to FIGS. 3 and 4, when the CHAR driver in the host believes it has emptied the CHAR driver event queue, it writes its updated host centric CHAR event queue read pointer back to the NIC 216, which compares it to the device centric write pointer to determine whether to re-enable CHAR driver interrupts (if the two pointers are equal) or assert a new interrupt (if the two drivers are unequal). A race condition, which could occur if the NIC was in the process of writing more user event queue wakeup events into the CHAR driver event queue while the CHAR driver in the host was determining that the next retrieved descriptor in the CHAR driver event queue was empty, is thereby avoided.

When the CHAR driver event handler retrieves a user event queue wakeup event from the CHAR driver event queue, it proceeds to activate the host event handler responsible for the event queue identified in the user event queue wakeup event.

There is a duality between the interrupt management mechanism used for the interrupting queues (the NET driver queues and the CHAR driver queues) and that used for non-interrupting queues (the user queues). As mentioned, the drivers for the interrupting queues enable and disable (suppress) interrupts for the particular queue whereas the drivers for the non-interrupting queues enable and disable the NIC's writing of wakeup events for the particular queue. The two processes are slightly different, in that for interrupting queues the default state is one in which interrupts will occur; they need to be suppressed during the time period that interrupts are not desired. For non-interrupting queues on the other hand the default state is one in which no wake-up events are written. A wake-up event must be requested in order for one to occur. Nevertheless, in both cases in the above-described embodiment the mechanism to enable or disable interrupts is similar to that for enabling or disabling wake-up events: they are disabled/suppressed/withheld in conjunction with the issuance of an interrupt/wake-up event, and they are re-enabled/allowed/requested by the writing of an updated event queue read pointer to the NIC. Thus no distinction is made herein among the phrases "enablement of interrupts", "allowing of interrupts", or "requesting of interrupts". Similarly no distinction is made herein among the phrases "enablement of wake-up events", "allowing of wake-up events", or "requesting of wake-up events". Even in an embodiment in which the mechanisms used for the interrupting queues are different from those used for the non-interrupting queues, no distinction is made herein among these terms.

It can be seen that the additional layer of indirection offered by sending wakeup events to a CHAR driver for coordination of interrupts permits user level queues and their drivers to operate in much the same way as the interrupting operating system queues, even though the user level drivers cannot actually receive interrupts. Even in an embodiment of multiple drivers which can receive interrupts, the additional layer of indirection is still beneficial because it helps to minimize interrupts not only for each event queue individually, but also across all the event queues generally.

The technique of a peripheral device writing an event (a "referencing" event) into an intermediary event queue, calling for the intermediary event queue handler to perform a function with respect to a different ("referenced") event queue, is not limited to wakeup events for activating the handler of a referenced queue that intentionally blocked awaiting for the wakeup event. Nor is it limited to situations in which the intermediary queue is an interrupting queue and the referenced queue is not. As an example, in one embodiment described in U.K. patent application No. 0404696.7, filed 3 Feb. 2004, entitled "Dual Driver Interface", incorporated by reference herein, a plurality of kernel event queues are supported. The peripheral device is able to detect when an event has remained on a queue (the referenced queue) for an extended period of time, indicating that the referenced queue is stuck. A queue might become stuck if for example the application, driver or transport library that was associated with that queue has failed, or has been terminated or de-scheduled. In response to such detection, instead of issuing an interrupt that is to be dealt with by the entity with which the referenced queue is associated, the network interface device issues an event (optionally with an associated interrupt) to another of the queues, preferably the queue of a control channel. This "referencing" event indicates its nature (i.e. an indication of a stuck queue) and the identity of the stuck queue. The entity associated with the control channel, which is preferably a control entity such as one of the drivers, is preferably arranged to respond to such a message by accessing and freeing the indicated queue. Many other uses of the intermediary queue technique will be apparent. Depending on the reason why the indicated queue became stuck, it may be that the handler for the now-freed event queue can then retrieve and handle one or more events on the queue.

Interrupt False Alarm Avoidance

Certain I/O buses, such as PCI 2.0 and PCI-X, support level-triggered interrupts in which the peripheral device raises an interrupt by bringing a signal line to an active state. In systems using level-triggered interrupts, a boundary condition exists which can create "false alarm" interrupts. Consider a situation in which the peripheral device raises its interrupt by bringing the interrupt signal line to its active level, and returns it to the inactive level only upon receipt of the interrupt acknowledgment from the host. If after writing the interrupt acknowledgment to the peripheral device, the host interrupt service routine exits before the peripheral device is able to de-activate the interrupt signal line, then the host may interpret the continued active signal line as a new interrupt and once again activate the event queue handler. If the event queue is still empty at that time, then this new "false alarm" interrupt will have caused a context switch by the host which was unnecessary.

In an embodiment that uses level-triggered interrupts, therefore, the likelihood of such false alarms can be minimized as follows. In response to an interrupt, the host subsystem reads a register on the NIC to determine which of a number of sources initiated the interrupt. The NIC de-activates the interrupt line in response to the host subsystem's reading of the interrupt source register. The NIC may generate further interrupts then if more events are generated after the reading of the interrupt source register, but no interrupts will be lost. Nor will the interrupt line be active at the time the host subsystem writes back its event queue read pointer, so neither will false alarm interrupts be generated.

In the multiple queue embodiments described above, a wakeup event is more akin to an edge-triggered interrupt than a level-triggered interrupt in the sense that no communication to the NIC is required to de-assert a wakeup event. There is no risk that the NIC will maintain a wakeup event active after the host event handler has deactivated itself, since the host can retire the wakeup event and deactivate itself in a coordinated manner. By its nature, therefore, assuming the event handler is designed properly, the false alarm issue need not arise in the context of wakeup events. The issue might still arise with respect to CHAR driver interrupts, however. In such a situation, one embodiment employs the false alarm prevention mechanism described above for the CHAR driver event queue and the race condition detection and remediation mechanism described above for the user event queues. In an embodiment that uses message-signaled interrupts (MSIs), as on a PCI-Express I/O bus, all queues use only the race condition mechanism described above.

Figure 16:
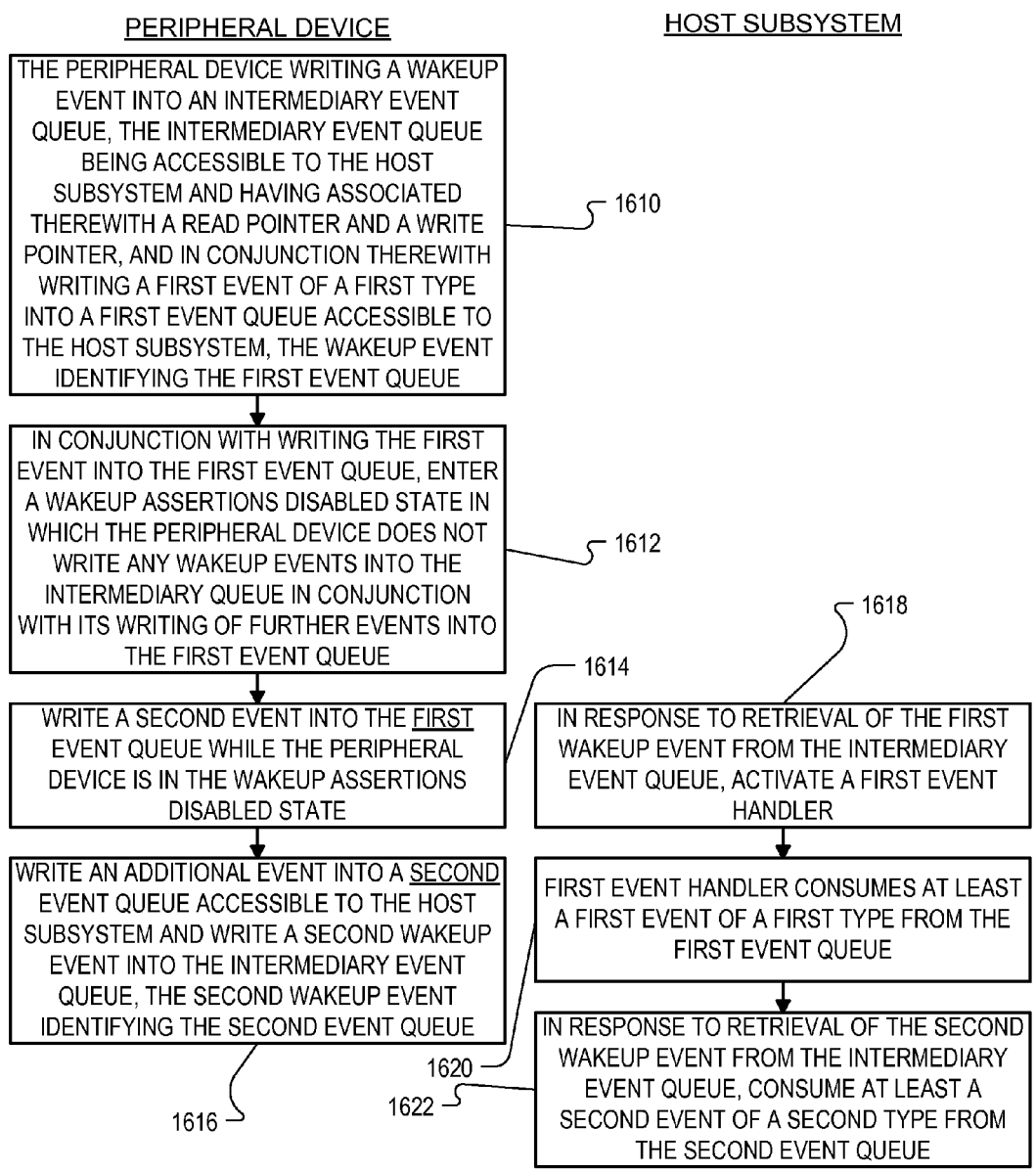
FIG. 16 illustrates a method of managing interaction between a host subsystem and a peripheral device in communication with the host subsystem via a peripheral bus.

FIG. 16 illustrates a method of managing interaction between a host subsystem and a peripheral device in communication with the host subsystem via a peripheral bus. In a step 1610, a peripheral device writes a first event into a first event queue accessible to the host subsystem, and in conjunction therewith, writes a wakeup event into an intermediary event queue accessible to the host subsystem, the wakeup event identifying the first event queue. In a step 1612, the peripheral device, in conjunction with writing the first event into the first event queue, enters a wakeup assertions disabled state in which the peripheral device does not write any wakeup events into the intermediary queue in conjunction with its writing of further events into the first event queue. In step 1614, the peripheral device writes a second event into the first event queue while the peripheral device is in the wakeup assertions disabled state, and in step 1616, the peripheral device also writes an additional event into a second event queue accessible to the host subsystem and writes a second wakeup event into the intermediary event queue, the second wakeup event identifying the second event queue. In step 1618, the host subsystem, in response to retrieval of the first wakeup event (the one from step 1610) from the intermediary event queue, activates a first event handler. In step 1620, the first event handler consumes at least a first event of a first type from the first event queue. In step 1622, in response to retrieval of the second wakeup event from the intermediary event queue, the host subsystem consume at least a second event of a second type from the second event queue.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information, for example by a known algorithm. In addition, the term "indicate" is used herein to mean the same as "identify".

Also as used herein, a "pointer" to a particular location in memory is information that "identifies" the particular location in memory. In one embodiment, the pointer comprises a first value that identifies an entry in a buffer descriptor table, which in turn identifies a base address of a buffer in host memory; and a second value that identifies an offset into that buffer; and may also include other parameters that are needed to identify the particular location in memory uniquely. Note that because of the definition of "identify" stated above, any read or write pointer that identifies a "next" location in a queue to be read or written, also identifies the last-read or last-written location, and vice-versa.

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method of managing interaction between a host subsystem and a peripheral device in communication with the host subsystem via a peripheral bus, comprising the steps of:

the peripheral device writing a first wakeup event into an intermediary event queue, the intermediary event queue being accessible to the host subsystem and having associated therewith a read pointer and a write pointer, and in conjunction therewith writing a first event of a first type into a first event queue accessible to the host subsystem, the first wakeup event identifying the first event queue;

the peripheral device, in conjunction with its writing of the first event into the first event queue, entering a wakeup assertions disabled state in which the peripheral device does not write any wakeup events into the intermediary queue in conjunction with its writing of further events into the first event queue;

the peripheral device writing a second event into the first event queue while the peripheral device is in the wakeup assertions disabled state;

the host subsystem, in response to retrieval of the first wakeup event from the intermediary event queue, activating a first event handler;

the host subsystem consuming events from the first event queue until the host subsystem determines that the first event queue is empty;

the host subsystem, in response to its determination that the first event queue is empty, identifying to the peripheral device an updated host centric first event queue read pointer; and the peripheral device, in response to receipt of the updated host centric first event queue read pointer, and further in response to a determination by the peripheral device that the updated host centric first event queue read pointer differs from a device centric first event queue write pointer, writing into the intermediary event queue a second wakeup event identifying the first event queue.

2. A method according to claim 1, further comprising the step of the peripheral device, in response to receipt of the updated host centric first event queue read pointer, and further in response to a determination by the peripheral device that the updated host centric first event queue read pointer matches the device centric first event queue write pointer, entering a wakeup assertions enabled state in which the peripheral device will write a wakeup event into the intermediary event queue in conjunction with its writing of a next event into the first queue.

3. A method according to claim 1, further comprising the steps of:
the peripheral device, in conjunction with its writing of the first wakeup event into the intermediary event queue, initiating a first interrupt of the host subsystem;
the peripheral device, in conjunction with its writing of the first wakeup event into the intermediary event queue, entering an interrupts disabled state in which the peripheral device does not initiate any interrupts of the host subsystem in conjunction with its writing of further wakeup events into the intermediary event queue; and
the peripheral device writing the second wakeup event into the intermediary event queue while the peripheral device is in the interrupts disabled state.

4. A method according to claim 1, further comprising the steps of:
the peripheral device, in conjunction with its writing of the first wakeup event into the intermediary event queue, initiating a first interrupt of the host subsystem;
the peripheral device, in conjunction with its writing of the first wakeup event into the intermediary event queue, entering an interrupts disabled state in which the peripheral device does not initiate any interrupts of the host subsystem in conjunction with its writing of further wakeup events into the intermediary event queue;
the host subsystem, in response to the first interrupt, consuming events from the intermediary event queue until the host subsystem determines that the intermediary event queue is empty;
the host subsystem, in response to its determination that the intermediary event queue is empty, identifying to the peripheral device an updated host centric intermediary event queue read pointer; and
the peripheral device, in response to receipt of the updated host centric intermediary event queue read pointer, and further in response to a determination by the peripheral device that the updated host centric intermediary event queue read pointer differs from a device centric event intermediary queue write pointer, initiating an additional interrupt of the host subsystem.

5. A method according to claim 1, wherein the peripheral device comprises a network interface device,
further comprising the step of transferring data between the network interface device and first data buffers in a memory of the host subsystem,
and wherein events of the first type indicate completion of the data transfer with at least one of the first data buffers.

6. A method according to claim 5, further comprising the steps of:
transferring data between the network interface device and second data buffers in the memory of the host subsystem;
the peripheral device writing the second event into the first event queue in conjunction with the transferring of data between the network interface device and second data buffers, the second event being of a second type, events of the second type indicating completion of the data transfer with at least one of the second data buffers; and
the peripheral device, in conjunction with its writing of the second event into the first event queue, updating the device centric event queue write pointer for the first event queue.

7. A method according to claim 6, wherein the step of the peripheral device writing a second wakeup event into the intermediary event queue, is performed in conjunction with the writing of the second event into the first event queue.

8. A method according to claim 6, wherein the step of the peripheral device writing a second event into the first event queue occurs after the step of the peripheral device writing the first event into the first event queue,
and wherein the step of the host subsystem consuming events from the first event queue comprises the step of the host subsystem consuming both the first event and the second event.

9. A method according to claim 6, wherein the step of transferring data between the network interface device and first data buffers comprises the step of transferring transmit data from the first data buffers to the network interface device for transmission onto a network,
and wherein the step of transferring data between the network interface device and second data buffers comprises the step of transferring into the second data buffers data received by the network interface device from the network.

10. A method according to claim 1, further comprising the steps of:
the peripheral device writing a third wakeup event into the intermediary event queue, the third wakeup event identifying a second event queue accessible to the host subsystem;
the host subsystem, in response to retrieval of the third wakeup event from the intermediary event queue, activating a second event handler; and
the second event handler consuming at least a second event of a second type from the second event queue.

11. A method of managing interaction between a host subsystem and a peripheral device in communication with the host subsystem via a peripheral bus, comprising the steps of:
the peripheral device writing a first event into a first event queue accessible to the host subsystem and writing a first referencing event into an intermediary event queue accessible to the host subsystem, the first referencing event identifying the first event queue;
the peripheral device, in conjunction with its writing of the first event into the first event queue, entering a first disabled state in which the peripheral device does not write any events into the intermediary queue identifying the first event queue in conjunction with its writing of further events into the first event queue;
the peripheral device, while in the first disabled state, writing a second event into a second event queue accessible to the host subsystem and writing a second referencing event into the intermediary event queue, the second referencing event identifying the second event queue;
the peripheral device, in conjunction with its writing of the second event into the second event queue, entering a second disabled state in which the peripheral device does not write any events into the intermediary queue identifying the second event queue in conjunction with its writing of further events into the second event queue;
the host subsystem, in response to retrieval of the first referencing event from the intermediary event queue, consuming at least a first event of a first type from the first event queue; and the host subsystem, in response to retrieval of the second referencing event from the intermediary event queue, consuming at least a second event of a second type from the second event queue, wherein the step of the host subsystem consuming at least a second event of a second type from the second event queue, comprises the steps of:

the host subsystem consuming events from the second event queue until the host subsystem determines that the second event queue is empty;

the host subsystem, in response to its determination that the second event queue is empty, identifying to the peripheral device an updated host centric second event queue read pointer; and the peripheral device, in response to receipt of the updated host centric second event queue read pointer, and further in response to a determination by the peripheral device that the updated host centric second event queue read pointer differs from a device centric second event queue write pointer, writing into the intermediary event queue a further referencing event identifying the second event queue.

12. A method according to claim 11, further comprising the step of the peripheral device, in response to receipt of the updated host centric second event queue read pointer, and further in response to a determination by the peripheral device that the updated host centric second event queue read pointer matches the device centric second event queue write pointer, entering a second enabled state in which the peripheral device will write a referencing event into the intermediary event queue identifying the second queue in conjunction with its writing of a next event into the second queue.

13. A method according to claim 11, further comprising the steps of:

the host subsystem, in response to its determination that the first event queue is empty, identifying to the peripheral device an updated host centric first event queue read pointer; and the peripheral device, in response to receipt of the updated host centric first event queue read pointer, and further in response to a determination by the peripheral device that the updated host centric first event queue read pointer matches a device centric first event queue write pointer, entering a first enabled state in which the peripheral device will write a referencing event into the intermediary event queue identifying the first queue in conjunction with its writing of a next event into the first queue.

14. A method according to claim 11, further comprising the steps of:

the peripheral device, in conjunction with its writing of the first referencing event into the intermediary event queue, initiating a first interrupt of the host subsystem;

the peripheral device, in conjunction with its writing of the first referencing event into the intermediary event queue, entering an interrupts disabled state in which the peripheral device does not initiate any interrupts of the host subsystem in conjunction with its writing of further wakeup events into the intermediary event queue; and the host subsystem retrieving both the first and second referencing events in response to the first interrupt.

15. A method according to claim 14, comprising the steps of:

the host subsystem, in response to the first interrupt, consuming events from the intermediary event queue until the host subsystem determines that the intermediary event queue is empty;

the host subsystem, in response to its determination that the intermediary event queue is empty, identifying to the peripheral device an updated host centric intermediary event queue read pointer; and the peripheral device, in response to receipt of the updated host centric intermediary event queue read pointer, and further in response to a determination by the peripheral device that the updated host centric intermediary event queue read pointer differs from a device centric event intermediary queue write pointer, initiating an additional interrupt of the host subsystem.

16. A method of managing a plurality of event queues, for use with a host subsystem and a peripheral device in communication with the host subsystem via a peripheral bus, comprising the steps of:

the peripheral device writing a first event of a first type into a first event queue accessible to the host subsystem;

the peripheral device, in conjunction with its writing of the first event into the first event queue, updating a device centric event queue write pointer for the first event queue;

the peripheral device, in conjunction with its writing of the first event into the first event queue, writing a first wake-up event into an intermediary event queue different from the first event queue;

the host subsystem, in response to its reading of the first wake-up event, consuming events from the first event queue until the host subsystem determines that the first event queue is empty;

the host subsystem, in response to its determination that the first event queue is empty, identifying to the peripheral device an updated host centric event queue read pointer for the first event queue;

the peripheral device, in response to receipt of the updated host centric event queue read pointer for the first event queue, and further in response to a determination by the peripheral device that the updated host centric event queue read pointer for the first event queue differs from the device centric event queue write pointer for the first event queue, writing an additional wake-up event into the intermediary event queue, the additional wake-up event identifying the first event queue.

17. A method according to claim 16, further comprising the step of the peripheral device writing a second event of a second type into a second event queue accessible to the host subsystem, wherein the first wake-up event identifies the first event queue and the second wake-up event identifies the second event queue.

18. A method according to claim 17, further comprising the step of the host subsystem, in response to its reading of the second wake-up event, consuming events from the second event queue until the host subsystem determines that the second event queue is empty.

19. A method according to claim 18, further comprising the steps of:

the host subsystem, in response to its determination that the second event queue is empty, identifying to the peripheral device an updated host centric event queue read pointer for the second event queue;

the peripheral device, in response to receipt of the updated host centric event queue read pointer for the second event queue, and further in response to a determination by the peripheral device that the updated host centric event queue read pointer for the second event queue differs from the device centric event queue write pointer for the second event queue, writing a further wake-up event into the intermediary event queue, the further wake-up event identifying the second event queue.

20. A method according to claim 17, wherein the step of the peripheral device writing a second event of a second type into the second event queue occurs after the step of the peripheral device writing a first event of a first type into the first event queue and before the host subsystem determines that the first event queue is empty in the step of the host subsystem consuming events from the first event queue.

21. A method according to claim 17, wherein the step of the peripheral device writing a second event of a second type into the second event queue occurs after the host subsystem determines that the first event queue is empty in the step of the host subsystem consuming events from the first event queue.

22. A method according to claim 16, further comprising the steps of:
   the peripheral device, in conjunction with its writing of the first wake-up event into the intermediary event queue, initiating a first interrupt of the host subsystem; and
   the host subsystem, in response to the first interrupt, reading the first wake-up event in the step of the host subsystem consuming events from the first event queue.

23. A method according to claim 16, wherein the peripheral device comprises a network interface device,
   further comprising the step of transferring data between the network interface device and first data buffers in a memory of the host subsystem,
   and wherein events of the first type indicate completion of the data transfer with at least one of the first data buffers.

24. A method according to claim 23, further comprising the steps of:
   transferring data between the network interface device and second data buffers in the memory of the host subsystem;
   the peripheral device, in conjunction with its transferring of data between the network interface device and second data buffers, writing a second event of a second type into the first event queue, events of the second type indicating completion of the data transfer with at least one of the second data buffers; and
   the peripheral device, in conjunction with its writing of the second event into the first event queue, updating the device centric event queue write pointer for the first event queue.

25. A method according to claim 24, further comprising the step of the peripheral device, in conjunction with its writing of the second event into the first event queue, initiating a second interrupt of the host subsystem.

26. A method according to claim 24, wherein the step of the peripheral device writing a second event of a second type into the first event queue occurs after the step of the peripheral device writing a first event of a first type into the first event queue and before the host subsystem determines that the first event queue is empty in the step of the host subsystem consuming events from the first event queue,
   and wherein the step of the host subsystem consuming events from the first event queue comprises the step of the host subsystem consuming both the first event and the second event before the host subsystem determines that the first event queue is empty.

27. A method according to claim 24, wherein the step of transferring data between the network interface device and first data buffers comprises the step of transferring transmit data from the first data buffers to the network interface device for transmission onto a network,
   and wherein the step of transferring data between the network interface device and second data buffers comprises the step of transferring into the second data buffers data received by the network interface device from the network.

28. A method according to claim 1, wherein the step of the peripheral device writing a wakeup event is performed in response to a step of the first event handler requesting a wakeup event from the peripheral device.

29. A method according to claim 1, wherein the first wakeup event indicates that the first event queue is stuck,
   and wherein the step of the peripheral device writing a first wakeup event is performed in response to a step of the peripheral device detecting that an event has remained on the first event queue for more than a particular period of time.

30. A method according to claim 1, further comprising the step of the host subsystem requesting from the peripheral device a wakeup event for the first event queue, and blocking an application in conjunction with the request, the application including the first event handler, the step of the peripheral device writing a first wakeup event into the intermediary event queue occurring in response to the request,
   and wherein the step of the host subsystem activating the first event handler comprises the step of the host subsystem, in response to retrieval of the first wakeup event from the intermediary event queue, activating the application.

31. A method according to claim 1, wherein the host subsystem includes a first set of data buffers and a first DMA descriptor queue, the first DMA descriptor queue containing descriptors identifying respective ones of the buffers in the first set of data buffers,
   and wherein one of the first and second events notifies the host subsystem of completion of a data transfer between the peripheral device and at least one of the buffers in the first set of data buffers.

32. A method according to claim 1, further comprising the step of the peripheral device writing a third wakeup event into the intermediary event queue and in conjunction therewith writing a third event into a second event queue accessible to the host subsystem, the third wakeup event identifying the second event queue,
   wherein the host subsystem further comprises first, second and third sets of data buffers and first, second and third DMA descriptor queues, each of the first, second and third DMA descriptor queues containing descriptors identifying respective ones of the buffers in respectively the first, second and third sets of data buffers,
   wherein the first event notifies the host subsystem of completion of a data transfer between the peripheral device and at least one of the buffers in the first set of data buffers,
   wherein the third event notifies the host subsystem of completion of a data transfer between the peripheral device and at least one of the buffers in the second set of data buffers,
   and wherein the second event notifies the host subsystem of completion of a data transfer between the peripheral device and at least one of the buffers in the third set of data buffers.

* * * * *